US012583330B2

(12) United States Patent　　　　(10) Patent No.:　US 12,583,330 B2

Brookshire　　　　　　　　　　　　(45) Date of Patent:　Mar. 24, 2026

(54) ONE PEDAL ROCKING TO FREE AN ELECTRIC VEHICLE FROM A STUCK CONDITION

(71) Applicant: Scout Motors, Inc., Tysons, VA (US)

(72) Inventor: Ryan James Brookshire, Ann Arbor, MI (US)

(73) Assignee: Scout Motors Inc., Tysons, VA (US)

( * ) Notice: Subject to any disclaimer, the term of this patent is extended or adjusted under 35 U.S.C. 154(b) by 157 days.

(21) Appl. No.: 18/436,124

(22) Filed: Feb. 8, 2024

(65) Prior Publication Data

US 2025/0256586 A1　　Aug. 14, 2025

(51) Int. Cl.
B60L 15/20　　　(2006.01)
B60L 3/00　　　(2019.01)

(52) U.S. Cl.
CPC ............. B60L 15/20 (2013.01); B60L 3/0023 (2013.01); *B60L 2240/463* (2013.01); *B60L 2250/16* (2013.01); *B60L 2250/28* (2013.01); *B60L 2260/26* (2013.01); *B60L 2260/28* (2013.01); *B60L 2260/40* (2013.01)

(58) Field of Classification Search
CPC .. B60L 15/20; B60L 3/0023; B60L 2240/463; B60L 2250/16; B60L 2250/28; B60L 2260/26; B60L 2260/28; B60L 2260/40
See application file for complete search history.

(56) References Cited

U.S. PATENT DOCUMENTS 5,109,819 A　*　5/1992　Custer ................... F02D 11/106
　　　　　　　　　　　　　　　　　123/399
7,631,574 B2 *　12/2009　Leone ...................... G05G 1/38
　　　　　　　　　　　　　　　　　74/513

8,725,368 B2 *　5/2014　Pudvay ............... F16H 61/0204
　　　　　　　　　　　　　　　　　701/56
9,162,586 B2 *　10/2015　Tang ..................... B60W 10/08
10,625,750 B2　4/2020　James et al.
2015/0175010 A1 *　6/2015　Tang ........................ H02H 7/08
　　　　　　　　　　　　　　　　　701/22
2017/0106865 A1 *　4/2017　Lavoie .................. B62D 13/06
2020/0079373 A1　3/2020　Ortmann et al.
2022/0297547 A1　9/2022　Yu

OTHER PUBLICATIONS

International Search Report and Written Opinion in connection to Application No. PCT/US2025/014923, dated May 28, 2025.

* cited by examiner

*Primary Examiner* — Gertrude Arthur Jeanglaude

(74) *Attorney, Agent, or Firm* — Meunier Carlin & Curfman LLC

(57)　　　　　ABSTRACT

A "one-pedal rocking mode" for extricating an electric vehicle from a stuck condition is implemented by: receiving, via a human-machine interface (HMI) of the electric vehicle, an indication of a user selection to activate the one-pedal rocking mode; operating the electric vehicle in the one-pedal rocking mode responsive to detecting movement of an accelerator pedal of the electric vehicle; controlling at least one electric motor of the electric vehicle to: (i) apply a forward torque to corresponding drive wheels when the accelerator pedal is in a first pedal position that exceeds a forward threshold, (ii) apply a reverse torque to the corresponding drive wheels when the accelerator pedal is in a second pedal position that is less than or equal to the forward threshold; and exiting the one-pedal rocking mode by switching operations of the electric vehicle to a second operating mode responsive to detecting an exit condition.

18 Claims, 10 Drawing Sheets

One-Pedal Rocking Mode
Active

Instructions (e.g., animation)
Warnings
Sensor Data

412

Exit

414

410

400

One-Pedal Rocking Mode

402

One-Pedal Rocking
Not Available

Vehicle Not In
Off-Road Mode

404

ONE PEDAL ROCKING TO FREE AN ELECTRIC VEHICLE FROM A STUCK CONDITION

BACKGROUND

When stuck (e.g., due to mud, sand, snow, ice, etc.), a common technique for extricating a vehicle is to induce a rocking motion (or "rock" the vehicle) to leverage the momentum of the vehicle to escape the stuck condition. Typically, this rocking motion is performed by alternating a transmission of the vehicle between forward and reverse gears, applying throttle each time the transmission is switched. For example, with an automatic transmission, an operator may alternate between drive (D) and reverse (R), sometimes even using second ($2^{nd}$) gear. However, with the mechanical transmissions in internal combustion engine (ICE) vehicles, there is a significant and unavoidable delay in switching from a drive gear to a reverse gear which greatly reduces the efficiency of this rocking technique. For example, the delay from the shifting from reverse to drive in an automatic transmission can cause the vehicle to settle back into the stuck condition before torque can be applied in an opposing direction. Further, switching from forward to reverse gears in a mechanical transmission has the potential to cause significant damage, or at least greatly increased wear, to the transmission.

SUMMARY

One implementation of the present disclosure is a controller for an electric vehicle, the controller including: at least one processor; and memory having instructions stored thereon that, when executed by the at least one processor, cause the controller to: receive, via a human-machine interface (HMI) of the electric vehicle, an indication of a user selection to enter a first operating mode for extricating the electric vehicle from a stuck condition; operate the electric vehicle in the first operating mode responsive to detecting movement of an accelerator pedal of the electric vehicle; while in the first operating mode, control at least one electric motor of the electric vehicle to: (i) apply a forward torque to corresponding drive wheels of the electric vehicle when the accelerator pedal is in a first pedal position that exceeds a forward threshold, (ii) apply a reverse torque to the corresponding drive wheels of the electric vehicle when the accelerator pedal is in a second pedal position that is less than or equal to the forward threshold; and exit the first operating mode by switching operations of the electric vehicle from the first operating mode to a second operating mode responsive to a determination that an exit condition has been met.

Another implementation of the present disclosure is a method of controlling an electric vehicle, the method including: receiving, via a human-machine interface (HMI) of the electric vehicle, an indication of a user selection to activate a first operating mode for extricating the electric vehicle from a stuck condition; operating the electric vehicle in the first operating mode responsive to detecting movement of an accelerator pedal of the electric vehicle; while in the first operating mode, controlling at least one electric motor of the electric vehicle to: (i) apply a forward torque to corresponding drive wheels of the electric vehicle when the accelerator pedal is in a first pedal position that exceeds a forward threshold, (ii) apply a reverse torque to the corresponding drive wheels of the electric vehicle when the accelerator pedal is in a second pedal position that is less than or equal to the forward threshold; and exiting the first operating mode by switching operations of the electric vehicle from the first operating mode to a second operating mode responsive to a determination that an exit condition has been met.

Yet another implementation of the present disclosure is an electric vehicle including: a human-machine interface (HMI) configured to display graphical user interfaces (GUIs) and receive user inputs; a powertrain including at least one electric motor configured to apply forward and reverse torque to corresponding drive wheels of the electric vehicle based on inputs to an accelerator pedal; and a controller configured to operate in a plurality of operating modes, including a first operating mode for extricating the electric vehicle from a stuck condition, wherein responsive to receiving an indication of a user selection to enter the first operating mode via the HMI and subsequently detecting movement of the accelerator pedal, the controller controls the at least one electric motor to: (i) apply a forward torque to the drive wheels when the accelerator pedal is in a first pedal position that exceeds a forward threshold, (ii) apply a reverse torque to the drive wheels when the accelerator pedal is in a second pedal position that is less than or equal to the forward threshold, wherein the controller is further configured to switch from the first operating mode to a second operating mode responsive to a determination that an exit condition has been met.

Additional features will be set forth in part in the description which follows or may be learned by practice. The features will be realized and attained by means of the elements and combinations particularly pointed out in the appended claims. It is to be understood that both the foregoing general description and the following detailed description are exemplary and explanatory only and are not restrictive, as claimed.

Figure 1:
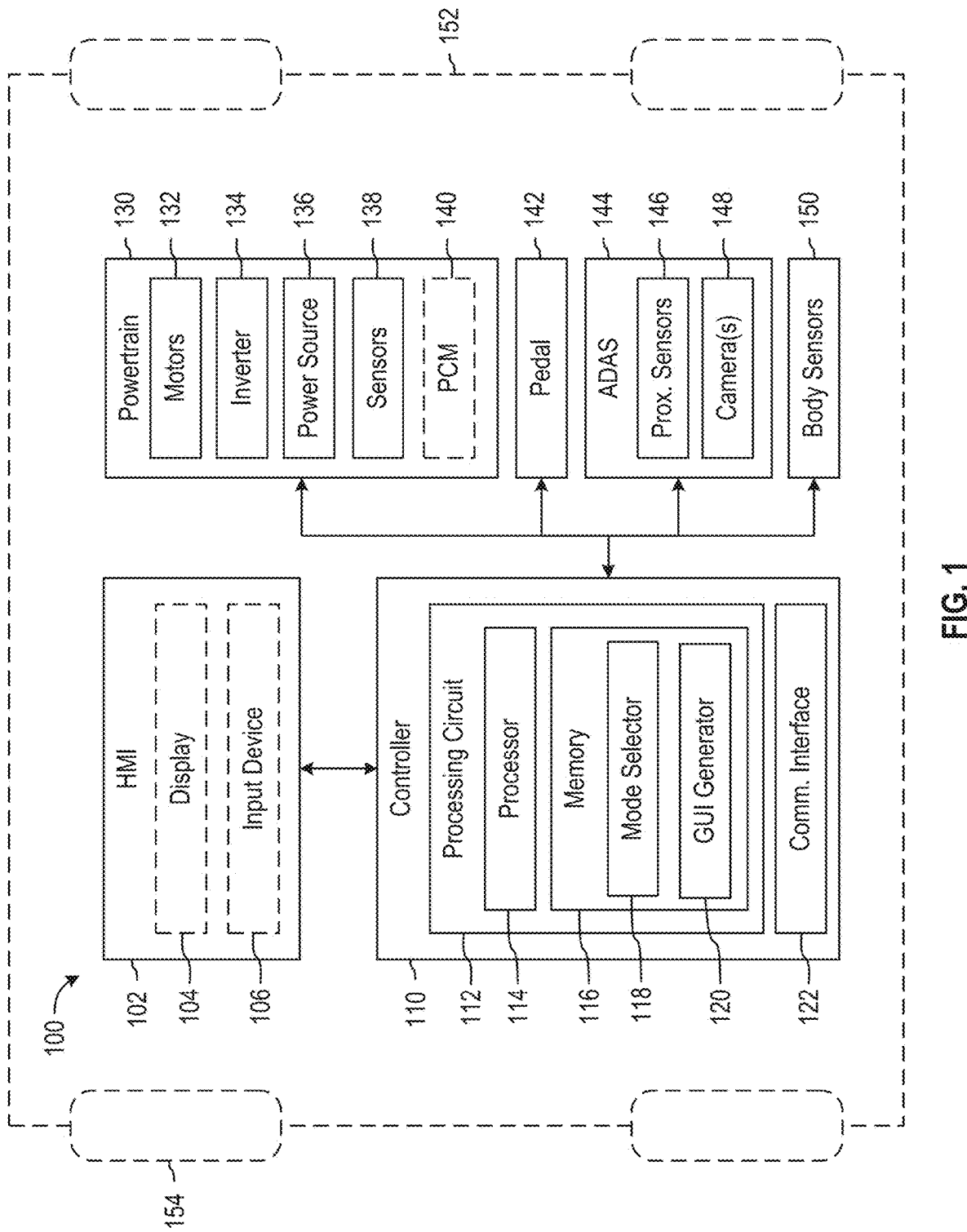
FIG. 1 is a block diagram of an electric vehicle control system, according to some implementations.

Various objects, aspects, and features of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, a control system and method for operating an electric vehicle in a "one-pedal rocking" mode, e.g., to extricate the electric vehicle from stuck conditions, are shown, according to various implementations. As mentioned above, a "stuck condition" generally refers to any condition in which a vehicle is not able to move a substantial distance in either a forward or reverse direction due to low traction on one or more drive wheels. Often, a stuck condition occurs when one or more drive wheels of the vehicle are in a rut or hole that provides inadequate traction to move the vehicle. For example, ruts can easily form in mud, snow, sand, or another type of deformable surface material due to the displacement of the deformable surface material, e.g., caused by the wheel of the vehicle or activity from other vehicles, due to weather or environmental conditions, etc. In such scenarios, attempts to accelerate the vehicle may cause one or more drive wheels of the vehicle in the rut to spin, while the other wheels of the vehicle are relatively stationary. For example, the one or more drive wheels in the low-traction rut may rotate at a speed substantially greater than zero, while the remaining wheels of the vehicle are not able to perform a full rotation or rotate at a speed near zero.

"One-pedal rocking," as described herein, generally refers to an operating mode for an electric vehicle that allows a user to rock the electric vehicle back and forth using only one pedal (e.g., the accelerator pedal) to extricate the electric vehicle from a stuck condition. Similar to the rocking technique described above for ICE vehicles with mechanical transmissions, this "rocking" of the electric vehicle is achieved by alternating a direction in which the drive wheels of the electric vehicle are spinning, e.g., by applying forward torque to the drive wheels, then reverse torque, then forward torque, etc. However, unlike ICE vehicles or any other vehicle with a mechanical transmission, electric vehicles have the ability to switch from the application of forward torque to the application of reverse torque nearly instantaneously, and without changing any physical gearing, by reversing a direction of rotation of an electric motor (e.g., which provides the force to drive the wheels of an electric vehicle).

Thus, with an electric vehicle powertrain, the electric motor is able to provide forward or backward propulsive torque without delay from switching gears. While techniques could be conceived to minimize the delay from switching gears in a mechanical transmission, there remains a physical limit to how quickly a mechanical transmission can switch from a forward gear to a reverse gear, which is significantly slower than the nearly instant reversal that can be achieved by an electric motor. The fact further remains that mechanical transmissions—and, indeed, the engines of ICE vehicles—include significantly more moving and interfacing components than the powertrain of an electric vehicle. Therefore, mechanical transmissions and ICE vehicles are prone to significant wear and damage from attempts to quickly shift from forward to reverse gearing; a shortcoming that is not addressed—and could, in fact, be aggravated—by attempts to minimize the above-mentioned delay in switching gears. In contrast, those in the art will appreciate that electric vehicle powertrains typically include far fewer moving and interfacing parts, thereby reducing opportunities for wear and damage, and are configured to handle the rapid changes in torque that can be achieved by an electric motor.

To make use of the inherent abilities of electric motors to rapidly switch their direction of rotation, thereby allowing an electric vehicle to switch between forward and reverse motion to initiate rocking, the disclosed control system generally includes a controller that activates the one-pedal rocking mode responsive to an indication from an operator of the electric vehicle. The controller further manages the application of forward and reverse torque to the drive wheels of the electric vehicle based on inputs to a single pedal (e.g., the accelerator pedal). In this regard and as described in detail below, an operator can use a single pedal to control the rocking of the electric vehicle, e.g., selectively applying forward and reverse torque by actuating the pedal, providing a significantly more user-friendly experience than attempting to rock an ICE vehicle or other vehicle with a mechanical transmission. For example, one-pedal rocking allows the operator to keep both hands on the steering wheel of the electric vehicle for greater control and does not require manually actuating a shifter to shift from forward to reverse.

Additionally, one-pedal rocking gives the operator of the electric vehicle greater control over the rocking motion, which can be a benefit to many operators. Stuck conditions are often unique and hard to predict, making extracting the vehicle a dynamic exercise-every scenario and rut is different and can require different techniques to escape. For example, the amount of forward and/or reverse torque applied, the amount of time spent in forward or reverse, the amount of time that one of the wheels of the vehicle is allowed to spin, and other operating parameters, can vary significantly when escaping different "stuck conditions." While a scenario could be envisioned in which an ICE vehicle or other vehicle with a manual transmission is designed to automate the switching of gears between forward and reverse, e.g., to minimize switching delay due to operator inputs and reduce wear on the transmission, a fully automated rocking mode may not provide the vehicle operator with desired control over the vehicle or the situation.

Further, a fully automated rocking procedure may not account for the variability between stuck conditions (e.g., based on the driving surface, environmental conditions, rut size, etc.) and therefore may not be suitable for extricating the vehicle from a variety of conditions.

For example, a fully automated rocking procedure may not hold one of the forward or reverse gears for a sufficient period of time or may not account for external conditions (e.g., the vehicle being stuck on an incline or decline) that can affect extricating the vehicle. In off-roading situations, for example, vehicle operators often prefer a significant amount of control over their vehicle, including in escaping stuck conditions.

To this point, in some implementations, the one-pedal rocking mode described herein can be activated by an operator of the electric vehicle (e.g., through a human-machine interface (HMI) of the electric vehicle) once the operator determines that the vehicle is "stuck." Once activated, the operator may be notified accordingly so that they know to begin manipulating the accelerator pedal of the vehicle. In some implementations, rocking is not initiated until movement of the accelerator pedal is detected. The operator may then depress the accelerator pedal to initiate forward motion (e.g., to apply forward torque to the drive wheels of the electric vehicle). Once the operator determines that the vehicle can make no more forward progress, they may "let off" the accelerator pedal (e.g., allow the accelerator pedal to return towards an initial position), which causes the above-mentioned controller to operate the powertrain of the electric vehicle to apply reverse torque to the drive wheels (e.g., as if the electric vehicle was in reverse gear). Subsequent depression of the accelerator pedal may again switch the direction of torque to the drive wheels to "forward," causing forward motion of the electric vehicle. With this technique, the operator will be able to quickly rock the vehicle free of the stuck condition and continue in a forward or reverse direction away from the obstacle.

Electric Vehicle Control System

Referring now to FIG. 1, a block diagram of an electric vehicle control system 100 is shown, according to some implementations. Generally, control system 100 is installed in an electric vehicle 152—or is formed of various components of electric vehicle 152—and is configured to control or affect operations of electric vehicle 152, including to operate electric vehicle 152 in a one-pedal rocking mode as mentioned above and discussed more below. Electric vehicle 152, as described herein, may generally be any vehicle (e.g., a car, truck, sport utility vehicle (SUV), crossover utility vehicle (CUV), etc.) powered by an electric motor (e.g., that includes an electric motor as the primary source of propulsion). Electric vehicle 152 may, specifically, be a battery-powered electric vehicle, sometimes referred to as a "battery electric vehicle (BEV)." However, certain implementations are contemplated herein in which electric vehicle 152 is instead a hybrid electric vehicle (HEV) or plug-in hybrid electric vehicle (PHEV), e.g., in which an ICE supplements an electric motor and/or charges a power supply (e.g., a battery pack of electric vehicle 152).

Electric vehicle 152 is shown to include wheels 154 that are driven by an electric motor (described below) to propel electric vehicle 152. Numerous other components of electric vehicle 152, such as body panels, axles, brakes, lights, etc., are not illustrated in FIG. 1 or described herein for the sake of brevity, as one of ordinary skill in the art would certainly understand the basic components of an electric vehicle. In the case of HEV or PHEVs, one of ordinary skill would also appreciate that electric vehicle 152 may include components such as an ICE engine and transmission.

At the heart of control system 100 is a controller 110 that, in part, controls operations of a powertrain 130 and other components of electric vehicle 152 according to a plurality of different operating modes, including the one-pedal rocking mode described herein. While in a specific operating mode, for example, controller 110 may at least partially control operations of powertrain 130 based on data, inputs, and the like, from various other components and systems of electric vehicle 152, as discussed in greater detail below. While illustrated as a single and distinct component of electric vehicle 152, it should be appreciated that controller 110, or the functionality thereof, may alternatively be part of or implemented by an existing controller or computing device of electric vehicle 152, or by multiple distributed controllers or computing devices. For example, controller 110 may be or may be part of an electric vehicle control module (VCU), an electric control unit (ECU), a body control module (BCM), etc., such that the functionality thereof is performed by an existing computing device of electric vehicle 152, or the functions of controller 110 may be distributed amongst existing computing devices of electric vehicle 152. It should be appreciated that the present disclosure is not intended to be limiting in this regard.

Regardless of its implementation, controller 110 is shown to include a processing circuit 112 which further includes a processor 114 and memory 116. Processor 114 can be a general-purpose processor, an application-specific integrated circuit (ASIC), one or more field programmable gate arrays (FPGAs), a group of processing components (e.g., a central processing unit (CPU)), or other suitable electronic processing structures. In some implementations, processor 114 is configured to execute program code stored on memory 116 to cause controller 110 to perform one or more operations, as described below in greater detail. It will be appreciated that, in implementations where controller 110 is part of another computing device, the components of controller 110 may be shared with, or the same as, the host device. For example, if controller 110 is implemented via a VCU of electric vehicle 152, then controller 110 may utilize the processing circuit, processor(s), and/or memory of the VCU to perform the functions described herein.

Memory 116 can include one or more devices (e.g., memory units, memory devices, storage devices, etc.) for storing data and/or computer code for completing and/or facilitating the various processes described in the present disclosure. In some implementations, memory 116 includes tangible (e.g., non-transitory), computer-readable media that stores code or instructions executable by processor 114. Tangible, computer-readable media refers to any physical media that is capable of providing data that causes controller 110 to operate in a particular fashion. Example tangible, computer-readable media may include, but is not limited to, volatile media, non-volatile media, removable media, and non-removable media implemented in any method or technology for storage of information such as computer-readable instructions, data structures, program modules, or other data. Accordingly, memory 116 can include random access memory (RAM), read-only memory (ROM), erasable programmable read-only memory (EPROM), electronically erasable programmable read-only memory (EEPROM), hard drive storage, temporary storage, non-volatile memory, flash memory, optical memory, or any other suitable memory for storing software objects and/or computer instructions. Memory 116 can include database components, object code components, script components, or any other type of information structure for supporting the various activities and information structures described in the present disclosure. Memory 116 can be communicably connected to processor 114, such as via processing circuit 112, and can include computer code for executing (e.g., by processor 114) one or more processes described herein.

While shown as individual components, it will be appreciated that processor 114 and/or memory 116 can be implemented using a variety of different types and quantities of processors and memory. For example, processor 114 may represent a single processing device or multiple processing devices. Similarly, memory 116 may represent a single memory device or multiple memory devices. Additionally, in some implementations, controller 110 may be implemented within a single computing device (e.g., one module, one housing, etc.). In other implementations, controller 110 may be distributed across multiple computing devices (e.g., that can exist in distributed positions on electric vehicle 152). For example, as mentioned above, controller 110 may include multiple distributed computing devices (e.g., multiple processors and/or memory devices), such as a VCU, ECU, BCM, etc., in communication with each other that collaborate to perform operations described herein.

Memory 116 is shown to include a mode selector 118 that facilitates the operation of electric vehicle 152 in a plurality of different operating modes, including the one-pedal rocking mode described herein. In particular, mode selector 118 may allow controller 110 to directly control one or more systems or components of electric vehicle 152, such as powertrain 130, to operate in a selected operating mode, and/or may cause controller 110 to transmit control signals to other systems and/or components of electric vehicle 152 to cause electric vehicle 152 to operate in the selected operating mode. In some implementations, controller 110 may directly control components of powertrain 130, e.g., by sending control signals directly to an inverter 134 of powertrain 130, to control the rotational speed and/or direction of electric motors 132. In other implementations, controller 110 can transmit data (e.g., instructions) or control signals to a powertrain control module (PCM) 140 of powertrain 130, causing PCM 140 to operate electric motors 132 and/or inverter 134 accordingly.

As discussed herein, "operating modes" generally refer to predefined modes of operation of electric vehicle 152, and the systems thereof, that define various operating parameters and that affect how electric vehicle 152 operates responsive to operator inputs. For example, in a "forward driving" mode, controller 110 may cause powertrain 130 to operate electric motors 132 to apply a forward propulsive torque to wheels 154 based on the actuation of an accelerator pedal 142 by an operator (e.g., as the operator depresses accelerator pedal 142, electric vehicle 152 is propelled forward at a corresponding acceleration). As another example, in a "snow mode," controller 110 may dull or delay a change in acceleration of electric vehicle 152 responsive to the actuation of accelerator pedal 142 to prevent slipping, and/or may cause powertrain 130 to operate in four-wheel drive (4WD) or all-wheel drive (AWD) (e.g., where power is provided to all four of wheels 154). It should be appreciated that the operating modes of electric vehicle 152 may be defined with any level of specificity. For example, a "normal" operating mode may simply allow electric vehicle 152 to be operated under normal conditions, e.g., in forward or reverse, with driving aids turned on, etc.

Mode selector 118 may also be configured to receive information (e.g., signals, data, etc.) from various components of electric vehicle 152 and can adjust the operations of electric vehicle 152 accordingly. For example, mode selector 118 may prevent electric vehicle 152 from operating in certain modes, switch an operating mode, adjust operating parameters, or otherwise affect the operations of electric vehicle 152 based on obtained information. In some such implementations, mode selector 118 may receive data from sensors 138 of powertrain 130, an advanced driver assistance system (ADAS) 144, body sensors 150, and other components or systems of electric vehicle 152. Sensors 138 of powertrain 130 may include any sensor or other feedback device that provides data relating to the operation of powertrain 130. For example, sensors 138 may include wheel speed sensors, voltage or current sensors (e.g., for monitoring energy provided from a power source 136 to electric motors 132), sensors in electric motors 132 and/or inverter 134 that determine a rotational speed and direction of electric motors 132, and the like. Sensors 138 may also represent feedback provided by components of powertrain 130 that are not sensing devices, per se. For example, inverter 134 may provide feedback on voltage, current, motor speed and direction, etc., without directly measuring these variables using a dedicated sensor.

ADAS 144 can include a suite of sensors and other components that assist an operator with the safe operation of electric vehicle 152. In some implementations, ADAS 144 includes proximity sensors 146 for detecting objects within a certain distance (e.g., a threshold distance) of electric vehicle 152. Proximity sensors 146 may include, for example, ultrasonic sensors or the like. In some implementations, ADAS 144 includes a camera or camera(s) 148 for detecting objects using captured image data. For example, camera(s) 148 may capture images or video of one or more areas surrounding electric vehicle 152, which is processed (e.g., by a dedicated computing device of ADAS 144 or controller 110) using object detection models to identify objects and detect obstacles. It should be appreciated that ADAS 144 can also include other types of sensors/components that are not explicitly shown in FIG. 1. For example, in some implementations, ADAS 144 includes one or more LiDAR or radar transceivers used for object detection, adaptive cruise control, blind spot monitoring, etc.

Body sensors 150 can include any of a wide range of additional sensors and sensing systems that can be included in modern electric vehicles. Body sensors 150 can include, for example, an inertial measurement unit (IMU) for detecting a positioning (e.g., pitch, roll, yaw) and/or motion of electric vehicle 152, a global positioning system (GPS) transceiver for determining a location and/or speed of electric vehicle 152, contact and/or airbag sensors for detecting contact with objects and/or deploying airbags, and more.

Mode selector 118 may generally be configured to enable different operating modes based on operator inputs, e.g., via HMI 102, but can also enable or switch operating modes based on conditions of electric vehicle 152 or an operating environment, data/information obtained from the various distributed components of electric vehicle 152, and/or for other reasons. For example, mode selector 118 may enable a one-pedal rocking mode responsive to an operator input via HMI 102. However, mode selector 118 may also evaluate information from powertrain 130 (e.g., from sensors 138), ADAS 144, body sensors 150, and/or other components or systems of electric vehicle 152, before permitting one-pedal rocking mode to be enabled, e.g., to ensure vehicle and operator safety. Additionally, mode selector 118 can switch operations of electric vehicle 152 to another operating mode (e.g., a "normal" operating mode) based on the information from powertrain 130, ADAS 144, body sensors 150, and/or other components or systems of electric vehicle 152. For example, mode selector 118 may exit one-pedal rocking mode and return to a standard operating mode responsive to detecting a hazard (e.g., an object in the vicinity of electric vehicle 152, excessive speed, etc.).

In some implementations, mode selector 118 may be configured to detect that electric vehicle 152 is in a stuck condition based on data from powertrain 130, ADAS 144, body sensors 150, and/or other components or systems of electric vehicle 152. For example, mode selector 118 may detect that one of wheels 154 is spinning significantly faster than the other wheels and/or that the speed of electric vehicle 152 does not align with the speed of one or more of wheels 154 (e.g., mode selector 118 may determine that one of wheels 154 is spinning significantly faster than the other wheels, yet the movement speed of electric vehicle 152 is zero or falls below some threshold). In some such implementations, responsive to detecting a stuck condition, mode selector 118 may cause a notification to be presented (e.g., via HMI 102) prompting an operator of electric vehicle 152 to activate the one-pedal rocking mode.

In response to an operating request to enter one-pedal rocking mode, mode selector 118 may first be configured to determine whether a plurality of "activation conditions" are met (e.g., before enabling one-pedal rocking mode). Activation conditions can include, for example: a speed of electric vehicle 152 being equal to zero (e.g., the vehicle is stationary); an all-wheel drive (AWD), four-wheel drive (4WD), or off-road setting of the electric vehicle being active (e.g., as determined by data from powertrain 130); an area within a threshold distance of electric vehicle 152 being free from obstacles (e.g., as determined by data from ADAS 144); and more. If one or more activation conditions are not met, then mode selector 118 may cause a notification to be displayed on HMI 102 alerting the operator as such. If the activation conditions are met, then mode selector 118 may wait for an operator input to accelerator pedal 142, e.g., to fully enable one-pedal rocking. As discussed below with respect to FIG. 2, for example, mode selector 118 may fully enable one-pedal rocking as soon as movement of accelerator pedal 142 is detected, or once accelerator pedal 142 crosses a position threshold (e.g., 30% of full throttle).

As the operator actuates accelerator pedal 142, mode selector 118 can interpret the operator inputs and control powertrain 130 accordingly (e.g., directly or by sending commands to inverter 134 or PCM 140). When accelerator pedal 142 is depressed beyond a first position threshold, e.g., in a first direction, mode selector 118 may cause electric motors 132 to provide forward torque to wheels 154. When accelerator pedal 142 is released or allowed to move past the first position threshold in a second direction, mode selector 118 may cause electric motors 132 to provide reverse torque to wheels 154. In this manner, an operator of electric vehicle 152 can "rock" the vehicle using only accelerator pedal 142. It should be noted that, in some implementations, mode selector 118 can limit the capacity (e.g., maximum torque and/or rotational speed) of electric motors 132—and thereby, the wheel speed of wheels 154—while in the one-pedal rocking mode. For example, mode selector 118 may limit operations of electric motors 132 to below maximum torque and/or wheel speed thresholds), which may be lower than the maximum torque and/or wheel speeds that electric vehicle 152 is able to achieve in normal operations (e.g., electric vehicle 152 may be limited to 25% of the maximum torque and/or wheel speed under normal operating conditions, while in one-pedal rocking mode).

While in one-pedal rocking mode, mode selector 118 may also monitor powertrain 130, ADAS 144, body sensors 150, and/or other components or systems of electric vehicle 152 to determine if exit conditions are met and, if so, can disable one-pedal rocking mode and switch to a different (e.g., standard) operating mode. As discussed below in greater detail with respect to FIG. 2, exit conditions can include, but are not limited to: an indication of an operator input (e.g., via HMI 102) to exit one-pedal rocking mode, exceeding a speed threshold, a load applied to electric motors 132 exceeding a load threshold, detection of an object within a threshold distance of electric vehicle 152, an AWD/4WD or off-road setting of electric vehicle 152 being inactive or deactivated, a time threshold being exceeded, a temperature of electric motors 132 and/or power source 136 exceeding a threshold (e.g., overheating), a power level of power source 136 falling below a threshold (e.g., to prevent depletion of power source 136 while performing one-pedal rocking), and more.

Figures 4A, 4B:
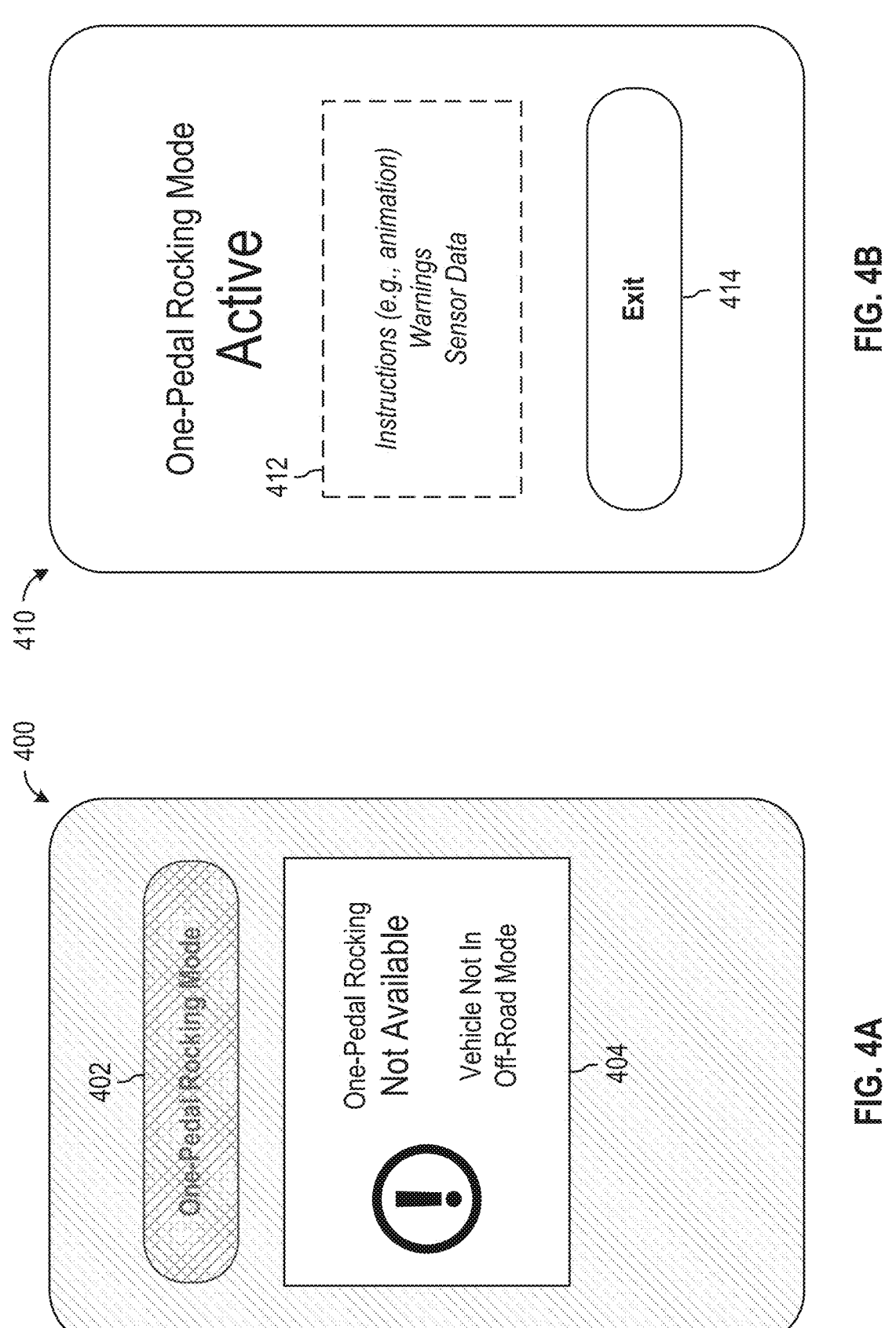
FIGS. 4A-4C are example graphical user interfaces (GUIs) relating to a "one-pedal rocking" mode that can be presented on a human-machine interface (HMI) of an electric vehicle, according to some implementations.
Figure 4C:
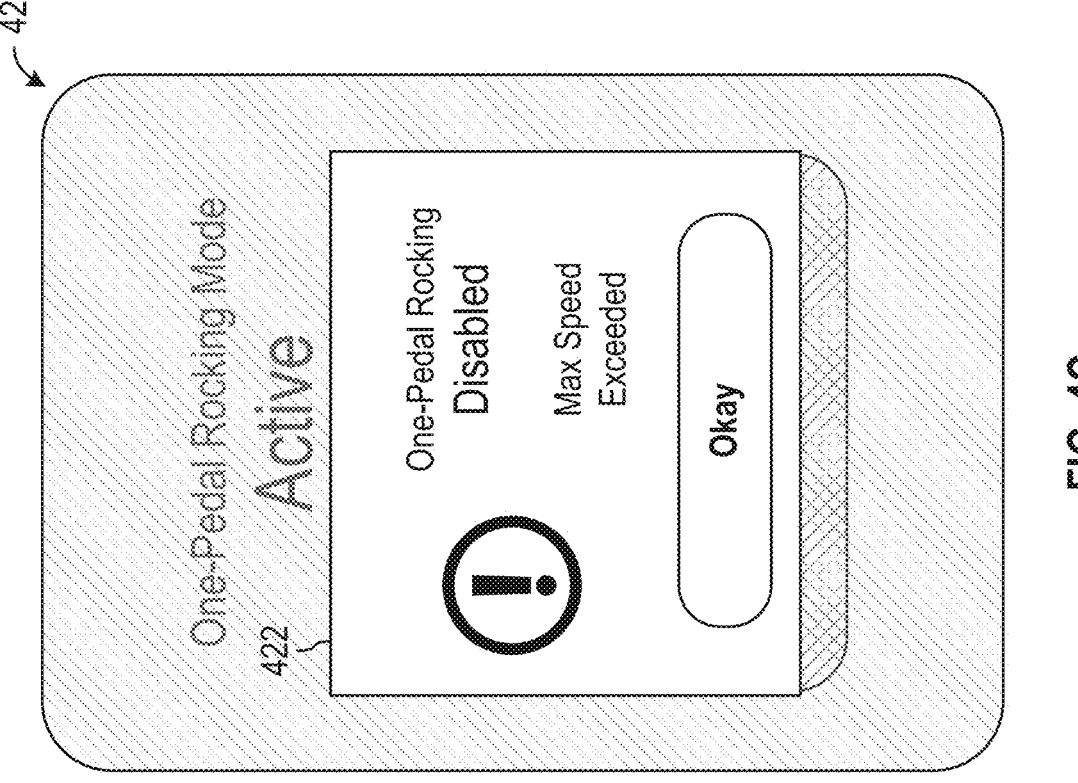

Still referencing controller 110, memory 116 is also shown to include a GUI generator 120 for generating GUIs to be presented via HMI 102. In particular, GUI generator 120 may generate a GUI that indicates the various operating modes of electric vehicle 152 that are able to be selected by an operator. For example, GUI generator 120 may generate a GUI that includes selectable icons associated with different operating modes, including one-pedal rocking mode. In some implementations, GUI generator 120 generates a GUI or GUIs that provide instructions or guidance for controlling electric vehicle 152 in a particular operating mode. For example, when one-pedal rocking mode is enabled, GUI generator 120 may generate a GUI that includes instructions (e.g., written instructions, an animation or video, etc.) demonstrating to the operator of electric vehicle 152 how to manipulate electric vehicle 152 to rock electric vehicle 152. In some implementations, GUI generator 120 generates alerts or notifications to be presented via HMI 102. For example, an alert or notification can be generated and presented if one-pedal rocking mode is not available (e.g., due to one or more activation conditions not being met) or if one-pedal rocking mode is disabled during operation (e.g., due to detection of a hazard). Some example GUIs are shown in FIGS. 4A-4C, discussed below.

Controller 110 is also shown to include a communications interface 122 that facilitates communications (e.g., the exchange of data) between controller 110 and various other components or devices of electric vehicle 152, including HMI 102 and powertrain 130. In this regard, communications interface 122 generally provides means for transmitting data to and/or receiving data from any of the components of electric vehicle 152 shown in FIG. 1, and indeed various other components that are not illustrated. Accordingly, communications interface 122 can be or can include a wired or wireless communications interface (e.g., jacks, antennas, transmitters, receivers, transceivers, wire terminals, etc.) for conducting data communications, or can be or include any combination of wired and/or wireless communication interfaces. For example, communications interface 122 can include any combination of wireless transceivers (e.g., cellular transceivers, Wi-Fi transceivers, short-range radio transceivers, etc.) or wired transceivers (e.g., a fiber optic transceiver, a controller area network transceiver, etc.). In this regard, communications via communications interface 122 may be direct (e.g., local wired or wireless communications) or via a network (e.g., a CAN bus). It should be appreciated that communications interface 122 can also act as an input/output (I/O) interface for transmitting and receiving analog signals, e.g., from various sensors, as discussed below.

HMI 102, as mentioned above, allows for user interaction with controller 110 and, optionally, other systems of electric vehicle 152. To this point, HMI 102 is generally configured to present (e.g., display) data to a user (e.g., an operator of electric vehicle 152) and to receive user inputs. HMI 102 may therefore include, in some implementations, a display 104, which is a device or component for presenting GUIs. Display 104 may include, for example, a liquid crystal display (LCD), a light-emitting diode (LED) display, or the like, capable of presenting GUIs in one or more colors. HMI 102 can also include, in some implementations, an input device 106 for receiving user inputs. Input device 106 can include, for example, a keypad, buttons, a microphone, a camera, or the like. In some implementations, display 104 and input device 106, or the functionality thereof, may be combined into a single device, such as a touchscreen display. In some implementations, HMI 102 includes a touchscreen display in combination with one or more physical input devices, such as buttons, knobs, etc.

As described herein, it should be appreciated that HMI 102 may be, or may be part of, an "infotainment system" of electric vehicle 152. For example, HMI 102 may be positioned at or near a center of a dashboard of electric vehicle 152 and can be integrated with a computing device, e.g., for playing media, adjusting climate controls, etc. In some implementations, controller 110 itself executes various functions of an infotainment system (not described herein); however, it should be understood that HMI 102 may be integrated with a separate computing device to enable functionality associated with an infotainment system and/or may be in communication with multiple computing devices, e.g., including controller 110. In some implementations, HMI 102 can include more than one display (e.g., display 104) and/or input component (e.g., input device 106). For example, HMI 102 may include both a touchscreen display positioned at or near a center of a dashboard of electric vehicle 152 (e.g., as an infotainment system) and may include a second display positioned in front of an operator of electric vehicle 152 (e.g., a digital gauge cluster).

As mentioned above, powertrain 130 generally includes all of the components that provide power to wheels 154, or that affect the power provided to wheels 154, to propel electric vehicle 152. A BEV powertrain, such as powertrain 130 typically includes components such as a battery pack or other energy storage element (e.g., a supercapacitor), an inverter, and at least one electric motor, among various other parts and components (e.g., axles or driveshafts, a cooling system, a charging system, etc.) that are not shown in FIG. 1 because they would be known to those of ordinary skill in the art. In the example of FIG. 1, these components of powertrain 130 are shown as electric motors 132, inverter 134, and power source 136. As described herein, power source 136 may be a battery pack or other suitable energy storage element, such a supercapacitor or supercapacitor bank, that provides electrical energy to electric motors 132 via inverter 134. In particular, inverter 134 can be configured to convert the direct current (DC) energy provided by power source 136 into alternating current (AC) for use in powering electric motors 132. Additionally, inverter 134 can control the rotational speed and direction of electric motors 132, e.g., by adjusting the frequency, amplitude, and/or phase of the AC provided to electric motors 132.

It should be appreciated that electric vehicle 152 may include only a single electric motor, e.g., which drives as few as one of wheels 154 or up to all four of wheels 154, or multiple electric motors (e.g., two or more electric motors). For example, electric motors 132 may include one electric motor that drives one or two of wheels 154 or may include two electric motors-one driving a front set of wheels 154 and one driving a rear set of wheels 154. In some implementations, electric vehicle 152 includes at least two motors such that all four of wheels 154 are powered. In this regard, electric vehicle 152 may be considered to operate in full-time 4WD or AWD; however, electric vehicle 152 may alternatively operate in 2WD and/or may be operated selectively in 2WD or 4WD. It should therefore be understood that the particular configuration of electric motors 132 and wheels 154 described herein is not intended to be limiting. Rather, it is important to note that any of wheels 154 that are powered by electric motors 132 are generally referred to herein as "drive" wheels, since they provide force to propel electric vehicle 152, while any of wheels 154 that are not powered by electric motors 132 are considered "non-drive" wheels.

As mentioned above, it should also be appreciated that the present disclosure contemplates implementations in which electric vehicle 152 is, instead, a HEV, PHEV, or the like. In some such implementations, it should be understood that the description provided herein of control system 100 and one-pedal rocking mode may be primarily applicable to situations in which electric vehicle 152 is operating in an electric-only mode, e.g., where the power provided to wheels 154 is solely from electric motors 132. In some such implementations, the ICE may be operated only to recharge power source 136, e.g., during operations of electric vehicle 152 in electric-only mode.

One-Pedal Rocking Mode

Figure 2:
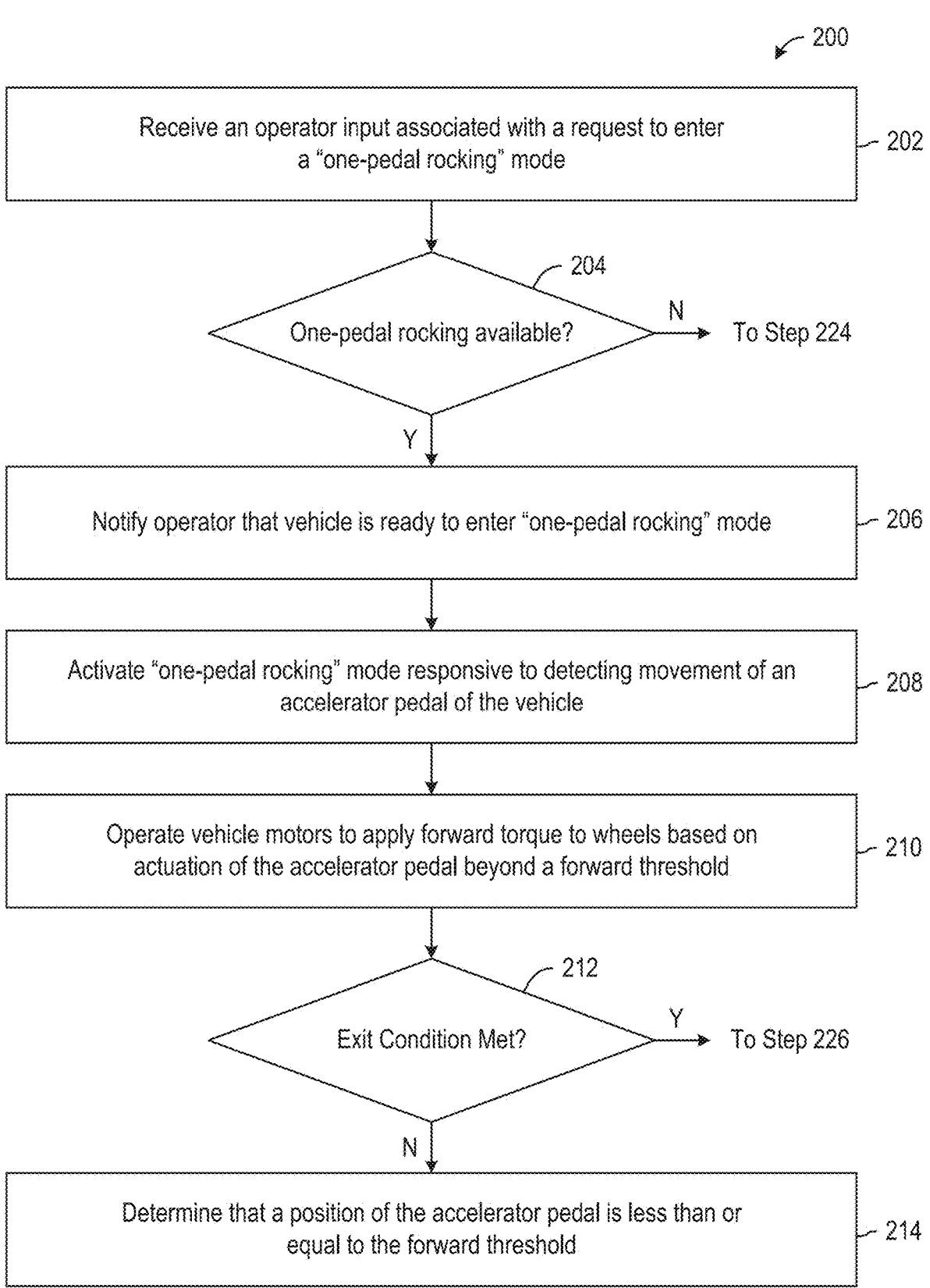
FIG. 2 is a flow chart of a process for operating an electric vehicle in a "one-pedal rocking" mode to extricate the electric vehicle from a stuck condition, according to some implementations.
Figure 2:
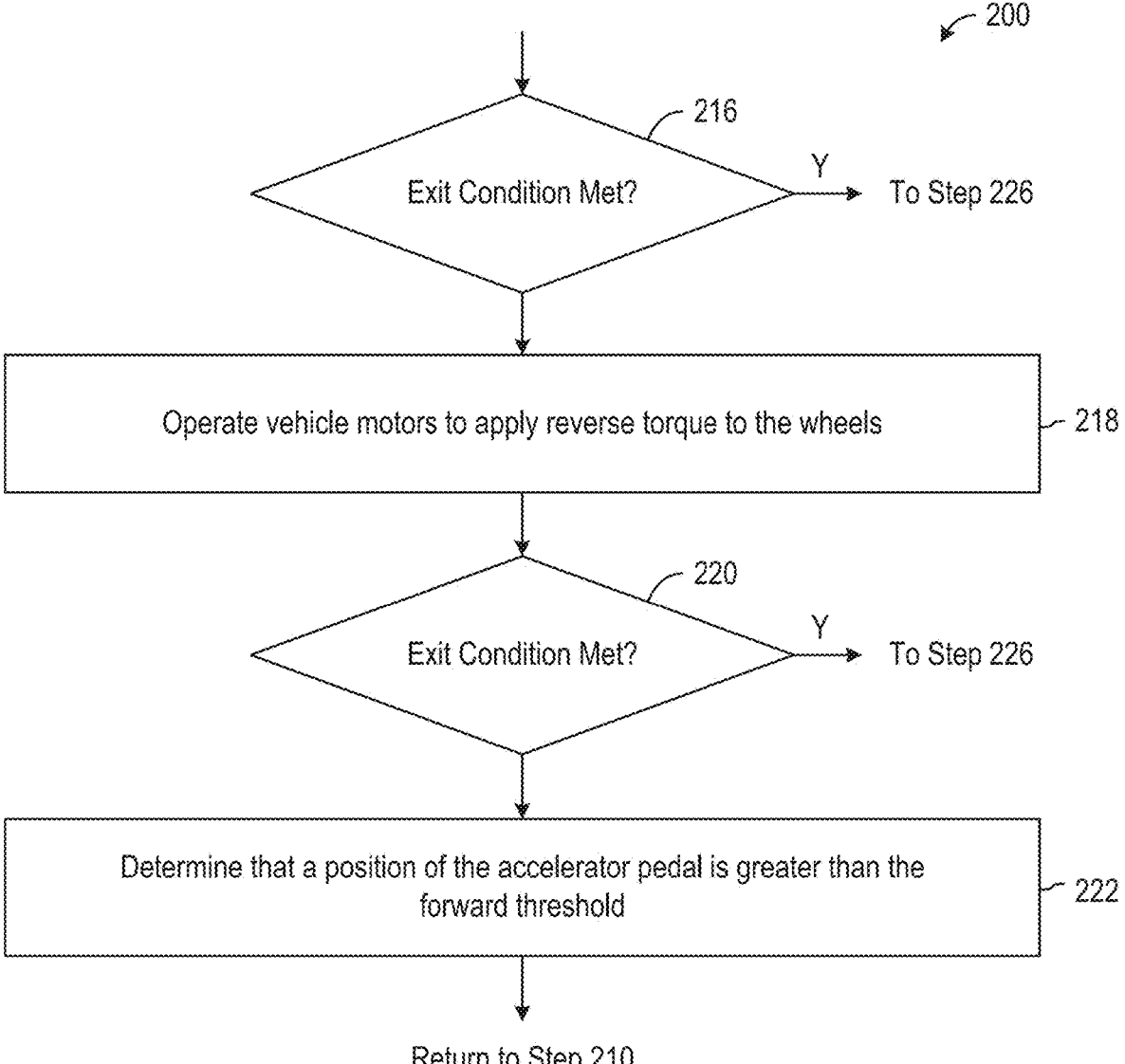
Figure 2:
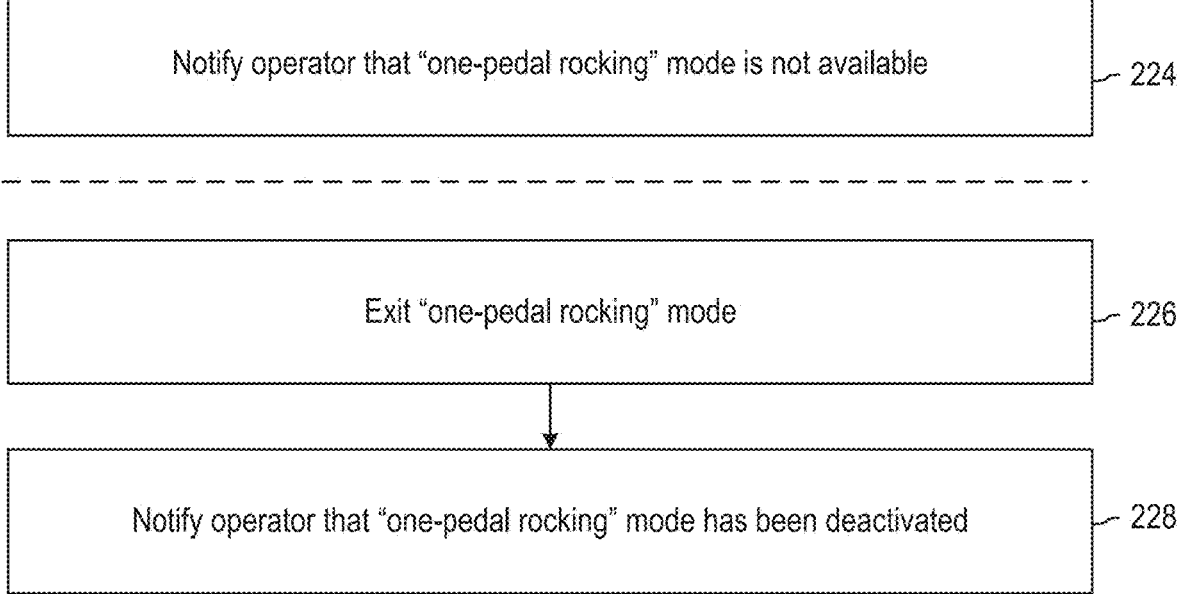

Referring now to FIG. 2, a flow chart of a process 200 for operating an electric vehicle (e.g., electric vehicle 152) in a one-pedal rocking mode to extricate the electric vehicle from a stuck condition is shown, according to some implementations. As described herein, process 200 can be implemented by controller 110—or more generally, control system 100—as described above. It should be appreciated, therefore, that process 200 may be specific to electric vehicles, e.g., which allow for one-pedal control and nearly instant reversal of propulsive torque. It will be appreciated that certain steps of process 200 may be optional and, in some implementations, process 200 may be implemented using less than all of the steps. It will also be appreciated that the order of steps shown in FIG. 2 is not intended to be limiting.

At step 202, an input from an operator or another user of an electric vehicle, associated with a request to enter a one-pedal rocking mode, is received. For the purposes of this discussion, the electric vehicle may be electric vehicle 152, as described above; however, it should be appreciated that process 200 can be adapted for implementation in other electric vehicles. Accordingly, with reference to electric vehicle 152, the operator input may be received via HMI 102. For example, the operator may select a "one-pedal rocking mode" button or icon on a touchscreen display of HMI 102 (e.g., as shown in FIG. 4A). However, other implementations are considered in which the operator input is received via another mechanism, such as via a physical button or knob, a voice command, etc. As mentioned above, in some implementations, an operator of electric vehicle 152 may be prompted to enter one-pedal rocking mode (e.g., prior to step 202) responsive to a determination that electric vehicle 152 is stuck, e.g., based on data from the various sensors and system of electric vehicle 152. For example, as mentioned above, a notification asking if the operator wants to activate one-pedal rocking may be presented if it is detected that one or more of wheels 154 is spinning, but that the speed of electric vehicle 152 is at or near zero.

At step 204, responsive to the operator input, a determination is made (e.g., by controller 110) as to whether one-pedal rocking mode is able to be activated. As mentioned above, this determination may be dependent on electric vehicle 152, and the systems thereof, meeting a plurality of activation conditions. The activation conditions evaluated by controller 110 can include, but are not limited to, a speed of electric vehicle 152 being zero (e.g., electric vehicle 152 is stationary), an AWD/4WD or off-road setting of the electric vehicle being active (e.g., to ensure that all four of wheels 154 are being powered), and/or an area within a threshold distance of electric vehicle 152 being free from obstacles (e.g., as determined by ADAS 144). Other activation conditions may include, for example, a temperature of electric motors 132 and/or power source 136 being within a specified range (e.g., to prevent overheating), a power level of power source 136 being above a threshold (e.g., to prevent depletion of power source 136 while performing one-pedal rocking), etc.

In some implementations, as mentioned above, controller 110 determines whether the activation conditions are met by evaluating data from sensors and/or systems of electric vehicle 152. For example, controller 110 may analyze data from ADAS 144 and/or otherwise communicate with ADAS 144 to determine if an area within a threshold distance of electric vehicle 152 is free of obstacles. As another example, controller 110 may evaluate data from inverter 134 and/or sensors 138 to determine a speed of electric motors 132 and/or wheels 154. If any of the activation conditions are not met, then process 200 may continue to step 224, where an operator of electric vehicle 152 is notified that one-pedal rocking is not available, as further discussed below. However, if all of the activation conditions are met, then process 200 may process to step 206.

Additionally, or alternatively, it should be appreciated that not all of the activation conditions may be required to be met in order to activate one-pedal rocking mode, in some implementations. For example, a first set of activation conditions may be required and a second set of activation conditions may be optional. In some such implementations, one-pedal rocking mode may be prevented from being enabled if any of the first set of activation conditions are not met, but one-pedal rocking mode may optionally be enabled if certain ones of the second set of activation conditions are not met. For example, the speed of electric vehicle 152 being at zero may be a "required" activation condition that prevents one-pedal rocking mode from being enabled if not met, whereas the charge level of power source 136 may be an optional activation condition that does not necessarily prevent one-pedal rocking mode from being enabled. In some implementations, a notification or alert may be presented to an operator of electric vehicle 152 if any optional activation conditions are not met, which requires the operator to acknowledge the risks associated with operating in one-pedal rocking mode despite the less-than-ideal conditions.

At step 206, the operator is notified that electric vehicle 152 is ready to enter one-pedal rocking mode. For example, a notification or GUI may be presented via HMI 102, a light may be illuminated on a dashboard or steering wheel of electric vehicle 152, an audible alert may be emitted by HMI 102, etc. In some implementations, a GUI is presented (e.g., via HMI 102) that further provides operator instructions for controlling the accelerator pedal while in one-pedal rocking mode, e.g., as shown in FIG. 4B. In some implementations, a GUI is presented (e.g., via HMI 102) that provides a warning indicating risks associated with operating in one-pedal rocking mode. For example, the GUI may include a disclaimer that one-pedal rocking mode could result in damage to electric vehicle 152 or objects external to electric vehicle 152. In some such implementations, the warning may require acknowledgment by the operator of electric vehicle 152 before one-pedal rocking mode can be fully activated. Regardless, after presenting the notification, controller 110 may wait to detect an operator input to accelerator pedal 142.

At step 208, one-pedal rocking mode is fully enabled responsive to detecting movement of accelerator pedal 142. In particular, controller 110 may monitor a position of accelerator pedal 142, e.g., based on data from a sensor of accelerator pedal 142, to determine that an operator has depressed accelerator pedal 142 to or beyond a threshold position, referred to herein as a "forward" threshold. As discussed herein, the forward threshold may be an initial or "zero" position of accelerator pedal 142, e.g., associated with no external force being applied to accelerator pedal 142. Alternatively, the forward threshold may be any position within a range of motion of accelerator pedal 142, e.g., as discussed below with respect to FIG. 3A.

As described herein, it should be appreciated that controller 110 may not necessarily directly measure the position of accelerator pedal 142, per se, but can at least infer the position of accelerator pedal 142 based on data from accelerator pedal 142. For example, accelerator pedal 142 may include a sensor (e.g., a potentiometer) that conveys a position of accelerator pedal 142 as value (e.g., a number) that can be interpreted by controller 110 as a percentage of a full range of motion of accelerator pedal 142, an angle with respect to an initial position of accelerator pedal 142, etc. Accordingly, the forward threshold may be represented as a numeric value (e.g., corresponding to raw sensor data from accelerator pedal 142), a percentage, an angle, or in any other format corresponding to the data provided by accelerator pedal 142 indicating the measured position of accelerator pedal 142.

Figure 3A:
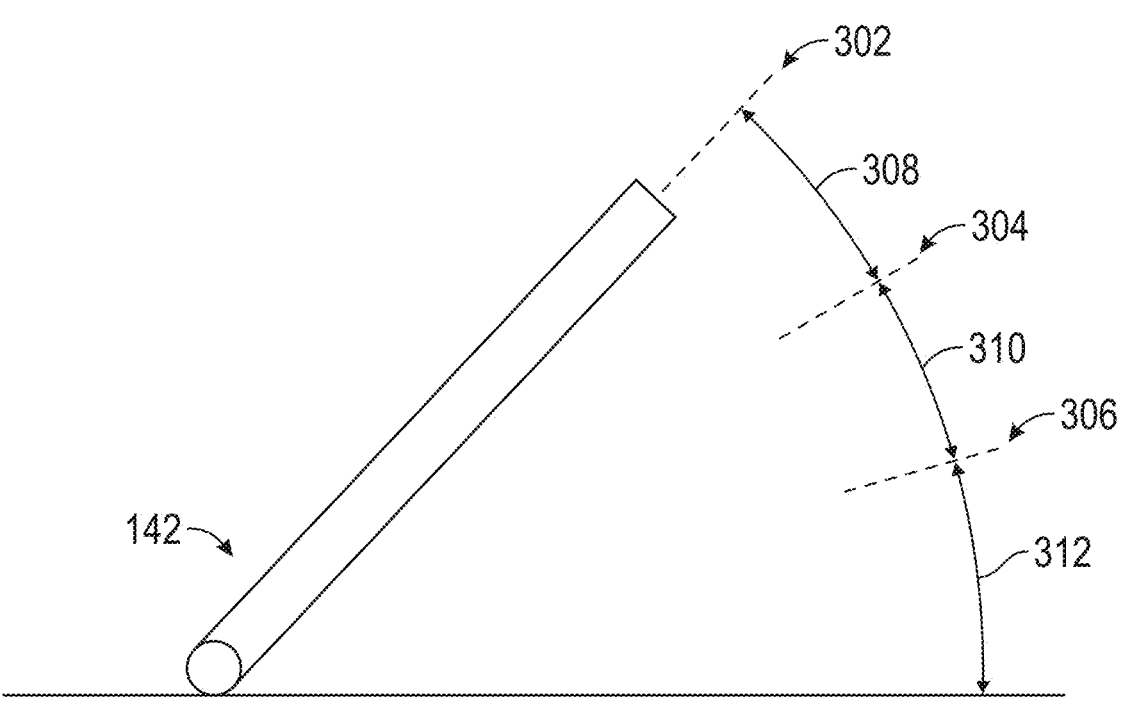
FIGS. 3A-3E are diagrams of accelerator pedal positioning for performing one-pedal rocking, according to some implementations.

With additional reference to FIG. 3A, an example diagram of accelerator pedal 142 is shown which illustrates a zero position 302. As mentioned above, zero position 302 may be an initial position of accelerator pedal 142, e.g., associated with no external force being applied to accelerator pedal 142. In some implementations, zero position 302 may also be the forward threshold mentioned above, such that any movement of accelerator pedal 142 beyond zero position 302 causes controller 110 to enable one-pedal rocking mode. Alternatively, the forward threshold mentioned above may be any position within the range of motion of accelerator pedal 142. In FIG. 3A, for example, a first position threshold 304 and a second position threshold 306 are also illustrated, either of which could be designated as the forward threshold for activating one-pedal rocking. For example, first position threshold 304 may be set as the forward threshold such that one-pedal rocking is not activated until accelerator pedal 142 is actuated to or beyond (e.g., in a first direction, toward second position threshold 306 or a floor of electric vehicle 152) first position threshold 304.

At step 210, at least one electric motor (e.g., electric motors 132) of electric vehicle 152 is operated to apply forward torque to corresponding drive wheels (e.g., wheels 154) when accelerator pedal 142 is in a first pedal position greater than (e.g., beyond, or passed) the forward threshold. In other words, electric motors 132 may be operated in a first direction of rotation to spin wheels 154 in a first direction for providing forward propulsion of electric vehicle 152. In some implementations, the rotational speed of electric motors 132 (and thereby of wheels 154) is dependent on the position/actuation of accelerator pedal 142 passed the forward threshold. For example, once accelerator pedal 142 is in a first pedal position greater than (e.g., beyond) the forward threshold, the speed of electric motors 132 in the first direction of rotation may be modulated according to movement of accelerator pedal 142 in a range of positions greater than (e.g., beyond) the forward threshold, e.g., to increase or decrease the speed of wheels 154 according to manipulation of accelerator pedal 142. Alternatively, in some implementations, electric motors 132 are operated at a set speed once accelerator pedal 142 is in the first pedal position greater than (e.g., beyond) the forward threshold.

With reference again to FIG. 3A, it should be appreciated that the speed of electric motors 132 may be commensurate with a position of accelerator pedal 142 beyond the forward threshold. In instances where the forward threshold is zero position 302, this means that accelerator pedal 142 may generally operate as normal, e.g., with the speed of electric motors 132 being modulated throughout the full range of motion of accelerator pedal 142. For example, when accelerator pedal 142 is at zero position 302, electric motors 132 are operated at zero speed (e.g., 0%) and when accelerator pedal 142 is fully depressed, electric motors 132 are operated at full speed (e.g., 100%). It should be appreciated, however, that the speed of electric motors 132 may be limited or reduced in one-pedal rocking mode, or the effect of inputs to accelerator pedal 142 on speed dulled, to prevent hazardous conditions, e.g., due to the ability of electric vehicles to provide large amounts of torque almost instantaneously. For example, under normal operations, electric motors 132 may be operated at 0% of their full capacity when accelerator pedal 142 is at zero position 302, and 100% of their full capacity when accelerator pedal 142 is fully depressed. However, in one-pedal rocking mode, fully depressing accelerator pedal 142 may cause electric motors 132 to operate at only 50% of their full capacity.

It should be appreciated that any position (e.g., not only zero position 302) in the range of motion of accelerator pedal 142 could be set as the forward threshold. For example, in some implementations, first position threshold 304 is set as the forward threshold. In some such implementations, the range of motion of accelerator pedal 142 that results in a change in operating speed of electric motors 132 may be reduced according. In other words, the forward threshold—rather than zero position 302—may become a new "zero" position, where the operating capacity of electric motors 132 is 0%, and the full depressed position of accelerator pedal 142 may become the new 100% mark (or, as noted above, the maximum operating capacity of accelerator pedal 142 may be reduced so that fully depressing accelerator pedal 142 results in operating electric motors 132 at 50% of their full speed). In this regard, the speed of electric motors 132 may be modulated only with in a corresponding range of motion, e.g., between first position threshold 304 and a fully depressed position of accelerator pedal 142. For example, if first position threshold 304 is set as the forward threshold, then the speed of electric motors 132 may be modulated commensurate with movement of accelerator pedal 142 in a second range of motion 310 and a third range of motion 312. In this regard, the range of motion in which movement of accelerator pedal 142 affects the speed of wheels 154 may be reduced when in one-pedal rocking mode.

In yet other implementations, the forward threshold (e.g., beyond which actuation of accelerator pedal 142 adjusts the speed of electric motors 132 to apply forward torque to wheels 154) may be separate from a threshold that initiates one-pedal rocking as at step 208. For example, in some such implementations, one-pedal rocking mode is activated (e.g., at step 208) responsive to any movement of accelerator pedal 142 beyond zero position 302, but electric motors 132 are not operated (e.g., caused to rotate in a first direction) until accelerator pedal 142 reaches or moves passed first position threshold 304. Thus, first range of motion 308 may act as a "buffer" or neutral zone, where actuation of accelerator pedal 142 does not result in operation of electric motors 132.

At step 212, while operating electric motors 132 in the first direction of radiation, e.g., to apply forward torque to wheels 154, various systems and sensors of electric vehicle 152 are monitored to determine if an exit condition is met. For example, controller 110 may monitor data from powertrain 130, ADAS 144, body sensors 150, and/or other sensors and systems of electric vehicle 152, e.g., by comparing received data to exit condition parameters, to determine if an exit condition is met. As mentioned above, exit conditions can include, but are not limited to, a speed of electric vehicle 152 exceeding a speed threshold, a load applied to electric motors 132 exceeding a load threshold, detection of an object within a threshold distance of electric vehicle 152, an AWD/4WD or off-road setting of electric vehicle 152 being inactive or deactivated, or a time threshold being exceeded. Other exit conditions may include, for example, a temperature of electric motors 132 and/or power source 136 exceeding a threshold (e.g., overheating), a power level of power source 136 falling below a threshold (e.g., to prevent depletion of power source 136 while performing one-pedal rocking), etc. It should be appreciated that a selection by the operator of electric vehicle 152, e.g., via HMI 102, to exit one-pedal rocking mode may also be an exit condition. If an exit condition is met, process 200 may continue to step 226, discussed below. Otherwise, process 200 may continue to step 214.

At step 214, it is determined that a position of accelerator pedal 142 (e.g., a second pedal position) is less than or equal to the forward threshold. In other words, it is detected that accelerator pedal 142 has been released (e.g., is not being depressed by an operator) and/or has been allowed to move past the forward threshold in a second direction. As discussed with respect to FIG. 3A, for example, the forward threshold may be zero position 302, e.g., associated with no external force being applied to accelerator pedal 142, such that process 200 moves to step 214 when the operator completely releases accelerator pedal 142. Alternatively, the forward threshold may be any position within a range of motion of accelerator pedal 142 such that process 200 moves to step 214 when accelerator pedal 142 is moved to a position equal to or passed the forward threshold and is moving in a direction toward zero position 302.

In some implementations, process 200 alternatively continues to step 214 once it is determined that accelerator pedal 142 is in a second pedal position less than or equal to a reverse threshold (e.g., a second threshold position) or has passed a reverse threshold and is moving in a direction toward the initial or "zero" position, with the reverse threshold being less than (e.g., closer to the initial or "zero" position of accelerator pedal 142) than the forward threshold. In FIG. 3A, for example, first position threshold 304 may be a reverse threshold and second position threshold 306 may be a forward threshold. Thus, steps 210-212 of process 200 may be continued also long as accelerator pedal 142 is within third range of motion 312, but process 200 may move to step 214 if accelerator pedal 142 moves to first position threshold 304 or to a position within first range of motion 308.

In such implementations, it will be appreciated that second range of motion 310 may act as a "buffer" or neutral zone, such that actuation of accelerator pedal 142 within second range of motion 310 does not result in operation of electric motors 132 in either a forward or reverse direction or does not change the direction of rotation of electric motors 132. For example, in some implementations, application of the torque in the most recent direction (e.g., forward or reverse) is maintained if accelerator pedal 142 is within the neutral zone (e.g., second range of motion 310). In other implementations, electric motors 132 are set to a zero speed within the neutral zone (e.g., second range of motion 310).

At step 216, responsive to determining that accelerator pedal 142 is in a second pedal position less than or equal to the forward threshold (or that accelerator pedal 142 has passed the reverse threshold), various systems and sensors of electric vehicle 152 are once again checked to determine if an exit condition is met. For the sake of brevity, examples of the exit conditions that are evaluated at step 216 are not repeated herewith, as it will be appreciated that the exit conditions evaluated at step 216 may be similar to or the same as the exit conditions evaluated at step 212 or may include any of the exit conditions described above. If an exit condition is met, process 200 may again continue to step 226, discussed below. Otherwise, process 200 may continue to step 218.

At step 218, electric motors 132 of electric vehicle 152 are operated to apply reverse torque to corresponding drive wheels (e.g., wheels 154) when accelerator pedal 142 is in the second pedal position. In other words, electric motors 132 may be operated in a second direction of rotation to spin wheels 154 in a second direction—opposite the first direction mentioned above—for providing reverse propulsion of electric vehicle 152. In some implementations, the rotational speed of electric motors 132 (and thereby of wheels 154) is dependent on the position/actuation of accelerator pedal 142 passed the forward threshold in a second direction. In other words, the speed at which electric motors 132 are operated may be controlled according to movement of accelerator pedal 142 within a range of motion less than or equal to the forward (or reverse) threshold. For example, once accelerator pedal 142 is in a second pedal position that is less than or equal to the forward threshold, the speed of electric motors 132 in the second direction of rotation may be modulated according to movement of accelerator pedal 142 in a range of positions less than or equal the forward threshold, e.g., to increase or decrease the speed of wheels 154 according to manipulation of accelerator pedal 142. Alternatively, in some implementations, electric motors 132 are operated at a set speed once accelerator pedal 142 is in the second pedal position less than or equal to the forward threshold. For example, if zero position 302 is set as the forward or reverse threshold, then electric motors 132 may be operated at a constant, set speed (in reverse) when accelerator pedal 142 is at zero position 302.

At step 220, while operating electric motors 132 in reverse, various systems and sensors of electric vehicle 152 are once again monitored to determine if an exit condition is met. For the sake of brevity, examples of the exit conditions that are evaluated at step 220 are not repeated herewith, as it will be appreciated that the exit conditions evaluated at step 220 may be similar to or the same as the exit conditions evaluated at step 212 or may include any of the exit conditions described above. It should be appreciated, however, that the exit conditions monitored at step 220 may specifically include a time threshold for operating electric motors 132 in reverse. For example, the time threshold may be five seconds, ten seconds, thirty seconds, or any other time period. Operations of electric motors 132 may be time-limited, e.g., to prevent an accident if electric vehicle 152 escapes the stuck condition while in reverse. For example, visibility and spatial awareness are often reduced when driving in reverse; thus, by limiting the amount of time that electric vehicle 152 can operate in reverse while in one-pedal rocking mode, a scenario can be prevented in which electric vehicle 152 escapes a stuck condition and continues to travel backward in an uncontrolled manner. In contrast, when traveling in a forward direction, an uncontrolled escape of electric vehicle 152 from a stuck condition is not as much of a concern, as an operator is typically facing forward and has a clear field of view in front of electric vehicle 152. Regardless, if an exit condition is met, process 200 may again continue to step 226, discussed below. Otherwise, if an exit condition is not met, process 200 may monitor a position of accelerator pedal 142 to determine if it is once again depressed to, or beyond, the forward threshold.

At step 222, it is again determined that the position of accelerator pedal 142 is greater than the forward threshold (e.g., accelerator pedal 142 is in the first pedal position). In other words, it is determined that an operator of electric vehicle 152 has again depressed accelerator pedal 142 to, or passed, the forward threshold. In turn, operations of electric motors 132 are switched to again apply forward torque to wheels 154, e.g., to move electric vehicle 152 forward. It should therefore be appreciated that steps 210-222 of process 200 may be repeated indefinitely to "rock" electric vehicle 152 until it is extricated from the stuck condition using only accelerator pedal 142, until an exit condition is met or an operator of electric vehicle 152 chooses to exit one-pedal rocking mode (e.g., by making a selection via HMI 102, as shown in FIG. 4B). Additional discussion is provided below with respect to FIGS. 3C-3E.

As mentioned above, in the event that one-pedal rocking mode is not able to be activated because an activation condition is not met, process 200 may continue to step 224. At step 224, the operator of electric vehicle 152 is notified that one-pedal rocking mode is not available. For example, a notification may be presented via HMI 102 indicating that one-pedal rocking mode is not available, and optionally indicating a reasoning that one-pedal rocking mode cannot be activated. An example of such a notification is shown in FIG. 4A.

As also mentioned above, if an exit condition is met during one-pedal rocking or if an operator of electric vehicle 152 chooses to end one-pedal rocking mode, process 200 may proceed to step 226. At step 226, one-pedal rocking mode is deactivated or "exited." In some implementations, exiting one-pedal rocking mode includes switching operations of electric vehicle 152—or, specifically, powertrain 130—to a second, different operating mode. This second operating mode may be a standard or "normal" operating mode, e.g., where accelerator pedal 142 can only be used to move electric vehicle 152 in one direction at a time, as selected by an operator.

At step 228, upon exiting one-pedal rocking mode and/or switching to a second operating mode, the operator may optionally be notified that one-pedal rocking mode has been disabled and/or that a new operating mode of electric vehicle 152 is enabled. For example, a notification may be presented via HMI 102 indicating that one-pedal rocking mode is disabled or identifying a new/current operating mode of electric vehicle 152.

Pedal Movement for One-Pedal Rocking

Figure 3B:
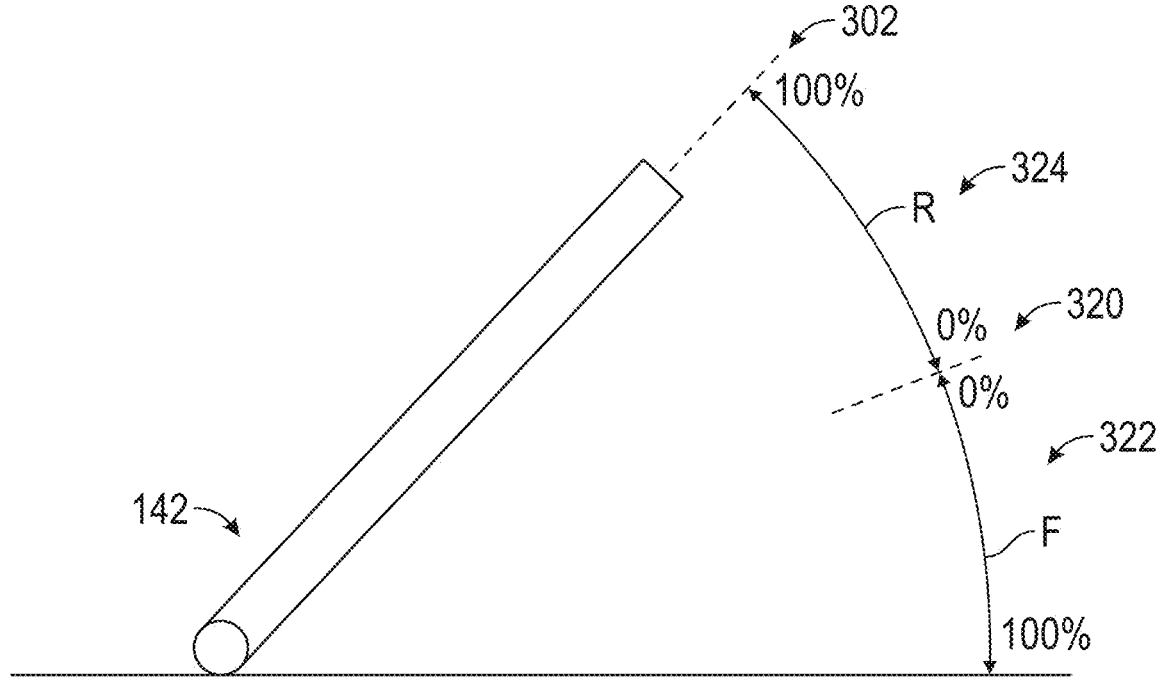

To better explain steps 210-220 of process 200, reference is again made to FIG. 3A and, additionally, FIG. 3B. As mentioned, in some implementations, zero position 302 may be the only threshold position (e.g., the forward threshold) defined within the range of motion of accelerator pedal 142. Therefore, any movement of accelerator pedal 142 beyond zero position 302 causes electric motors 132 to operate in a first direction, e.g., to provide forward torque to wheels 154, as in step 210. However, once an operator releases accelerator pedal 142 and allows it to return to zero position 302, e.g., at step 214, electric motors 132 may be operated in reverse at a set speed, e.g., at step 218. In such implementations, electric motors 132 may generally be operated at a predefined speed in both the forward and reverse directions (e.g., accelerator pedal 142 may effectively operate as a "switch" to change between set forward and reverse speeds).

In other implementations, first position threshold 304 can be defined as the threshold position or "forward threshold." In some such implementations, electric motors 132 may be operated to provide forward torque according to movement of accelerator pedal 142 with a range of positions beyond first position threshold 304, e.g., in a first direction. For example, electric motors 132 may be operated in a first direction according to movement of accelerator pedal 142 within second range of motion 310 and third range of motion 312. Accordingly, in such implementation, electric motors 132 are operated to apply reverse torque according to movement of accelerator pedal 142 with a range of positions beyond first position threshold 304, e.g., in a second direction opposite the first. For example, electric motors 132 may be operated in a second (e.g., reverse) direction according to movement of accelerator pedal 142 within first range of motion 308.

FIG. 3B provides an additional illustration of such implementations. In this example, a forward threshold 320 is set at a point within the range of motion of accelerator pedal 142 (e.g., about halfway through the range of motion, in this case). To initiate one-pedal rocking, as discussed above, accelerator pedal 142, may need to be depressed to or passed forward threshold 320, or simply to any position beyond zero position 302. However, electric motors 132 are not operated to apply forward torque to wheels 154 until accelerator pedal 142 is depressed beyond forward threshold 320. Then, as also discussed above, the speed of electric motors 132 (and thereby wheels 154) may be modulated according to movement of accelerator pedal 142 within a forward operating range 322. In this example, electric motors 132 are operated at 0% when accelerator pedal 142 is at or near forward threshold 320 and 100% when accelerator pedal 142 is fully depressed; however, as mentioned above, the response of electric motors 132 to inputs from accelerator pedal 142 may be dulled in one-pedal operating mode, so 100% may not represent a true "full capacity" or full speed of electric motors 132 but instead may represent a maximum operating speed of electric motors 132 when in one-pedal rocking mode (e.g., 25% of normal operating speed).

To apply reverse torque to wheels 154, thereby causing electric vehicle 152 to move in reverse, the operator may release accelerator pedal 142 and allow it to move to, and passed, forward threshold 320. Once accelerator pedal 142 is in a position less than or equal to forward threshold 320, e.g., moving in a direction toward zero position 302, electric motors 132 may be operated in reverse to apply reverse torque to wheels 154. Accordingly, in the forward direction, the speed of electric motors 132 (and thereby wheels 154) may be modulated according to movement of accelerator pedal 142 within a reverse operating range 324. In this example, electric motors 132 are operated (in reverse) at 0% when accelerator pedal 142 is at or near forward threshold 320 and 100% when accelerator pedal 142 is fully released; however, as mentioned above, the response of electric motors 132 to inputs from accelerator pedal 142 may be dulled in one-pedal operating mode, so 100% may not represent a true "full capacity" or full speed of electric motors 132 but instead may represent a maximum operating speed of electric motors 132 when in one-pedal rocking mode.

It should be appreciated that, in some implementations, the transition from forward to reverse operations of electric motors 132 may be controlled so as to not be instantaneous, despite the ability of electric motors 132 to instantly switch their direction of rotation, to protect various other components of powertrain 130 from unnecessary wear due to the sudden reversal of applied torque. For example, if an operator of electric vehicle 152 were to fully depress accelerator pedal 142, e.g., to apply full forward torque, and then suddenly release accelerator pedal 142 completely so that it returns to zero position 302, controller 110 may prevent electric motors 132 from suddenly and immediately switching from forward to reverse rotation. Instead, a slight delay may be provided between forward and reverse operations of electric motors 132 to prevent damage. Alternatively, controller 110 may control electric motors 132 to ramp down from a first direction of rotation and to ramp up into a second direction of rotation. However, due to the nature of electric motors 132, this delay may be sufficiently short, or the ramp up/down sufficiently quick, so as to not be noticeable to an operator of electric vehicle 152.

In some implementations, as mentioned above, separate forward and reverse thresholds may be defined. For example, second position threshold 306 may be a forward threshold and first position threshold 304 may be a reverse threshold. Accordingly, electric motors 132 may be operated to provide forward torque according to movement of accelerator pedal 142 within third range of motion 312. However, once accelerator pedal 142 crosses first position threshold 304, e.g., and is moving towards zero position 302, electric motors 132 may be operated to apply reverse torque according to movement of accelerator pedal 142 within first range of motion 308. In other words, steps 210-212 of process 200 may be repeated as long as accelerator pedal 142 is within third range of motion 312 and steps 218-220 may be repeated as long as accelerator pedal 142 is within first range of motion 308. Accordingly, in some such implementations, second range of motion 310 may act as a "buffer zone," such that actuation of accelerator pedal 142 within second range of motion 310 does result in operation of electric motors 132. In such implementations, this "buffer zone" may serve to prevent sudden and immediate changes in the direction of rotation of electric motors 132, e.g., as discussed above.

In other such implementations, electric motors 132 may be operated to provide forward torque according to movement of accelerator pedal 142 within second range of motion 310 and third range of motion 312, but the operation of electric motors 132 in the forward direction is not initiated until accelerator pedal 142 first crosses second position threshold 306 (e.g., when moving from zero position 302). In other words, accelerator pedal 142 may need to be depressed to or beyond second position threshold 306 to initiate forward motion of electric vehicle 152 but, once "forward operations" are activated, the speed of electric motors 132 may be modulated within both second range of motion 310 and third range of motion 312 (e.g., so second position threshold 306 may represent about a 50% operating speed/capacity of electric motors 132). Likewise, electric motors 132 may be operated to apply reverse torque according to movement of accelerator pedal 142 within first range of motion 308 and second range of motion 310, but the operation of electric motors 132 in the reverse direction is not initiated until accelerator pedal 142 first crosses first position threshold 304 (e.g., when moving from a depressed position beyond first position threshold 304).

Figure 3C:
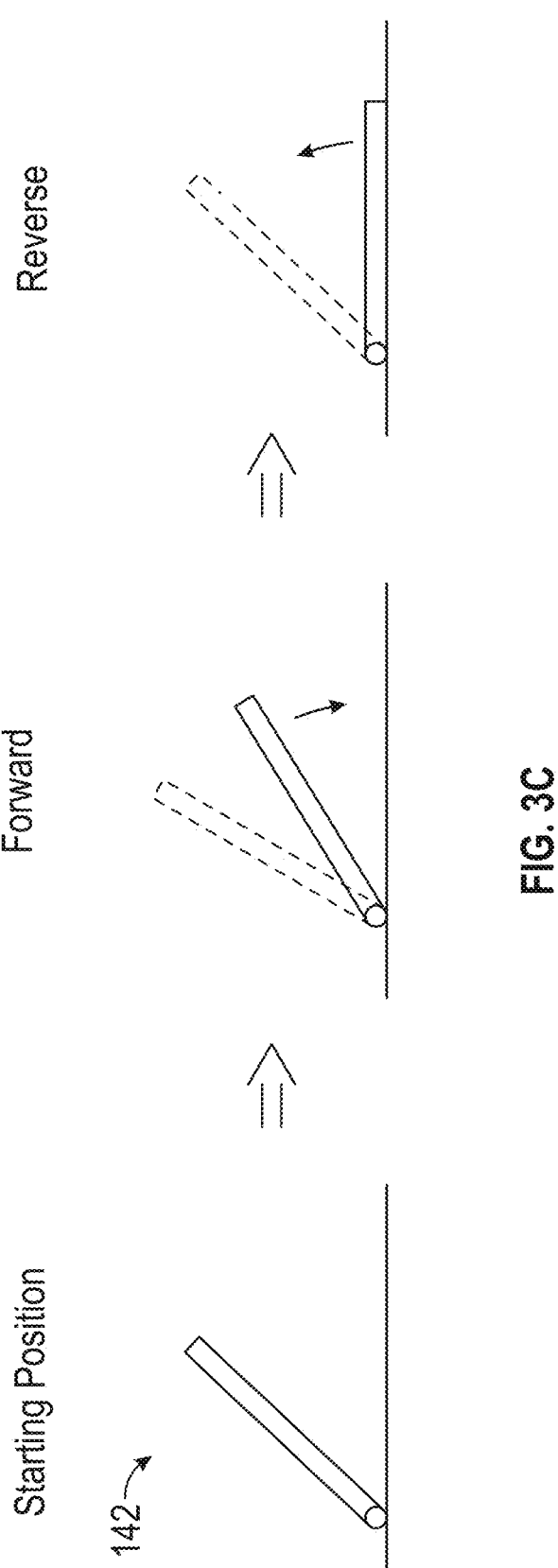
Figure 3D:
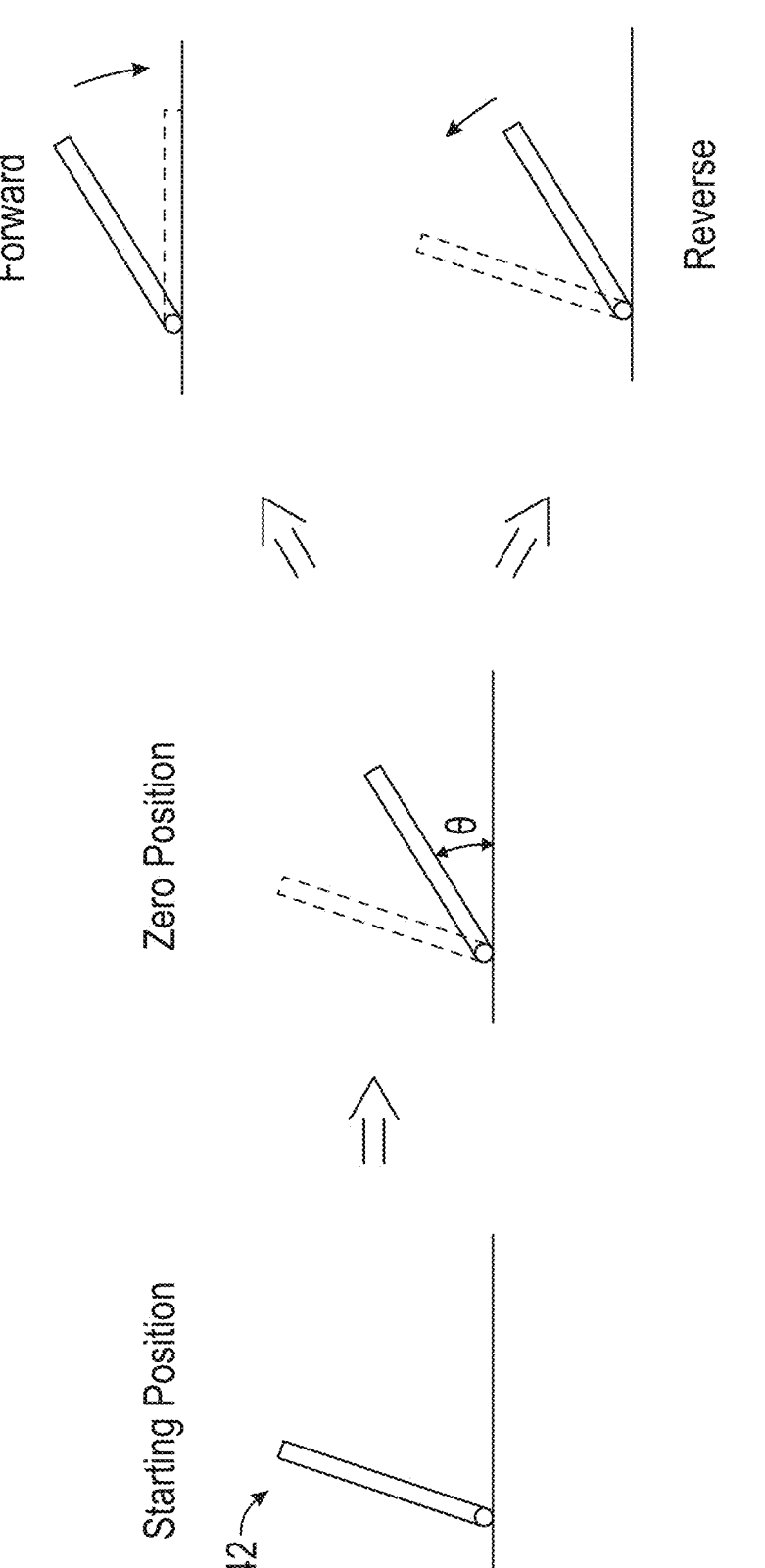
Figure 3E:
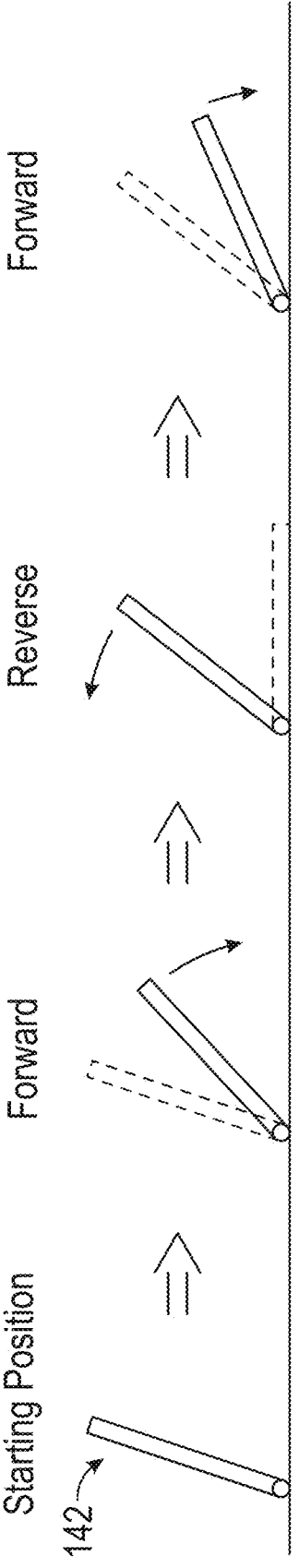

Referring now to FIGS. 3C-3E, additional diagrams illustrating movement of accelerator pedal 142 to perform one-pedal rocking are shown, according to some implementations. FIG. 3C, in particular, illustrates an implementation in which zero position 302 is the position threshold or "forward threshold," or in which depression of accelerator pedal 142 causes electric motors 132 to operate in a forward direction and release of accelerator pedal 142 causes electric motors 132 to operate in a reverse direction. As shown, for example, accelerator pedal 142 begins in a starting position (e.g., zero position 302) and is actuated in a first direction (e.g., depressed towards the floor of electric vehicle 152) to initiate forward motion. Then, when accelerator pedal 142 is released, or moved towards the starting position, electric motors 132 are operated in reverse to initiate reverse motion of electric vehicle 152.

FIG. 3D illustrates another implementation in which a "zero position," e.g., between a starting position (e.g., zero position 302) and a fully depressed position of accelerator pedal 142 is the position threshold or "forward threshold." In this implementation, one-pedal rocking mode may be initiated responsive to movement of accelerator pedal 142 from the starting position, or once accelerator pedal 142 crosses the zero position. Then, forward movement of electric vehicle 152 is caused by actuation of accelerator pedal 142 in a first direction from the zero position (e.g., towards the floor of electric vehicle 152) and reverse movement of electric vehicle 152 is caused by actuation of accelerator pedal 142 in a second direction from the zero position (e.g., towards the starting position or zero position 302).

FIG. 3E illustrates a full "rocking cycle" of electric vehicle 152, e.g., from step 208 to step 220 of process 200. As shown, accelerator pedal 142 begins in a fully released starting position. To activate one-pedal rocking, the operator provides an input to accelerator pedal 142 to move accelerator pedal 142 from the starting position. Forward torque is then applied to wheels 154, e.g., based on a position of accelerator pedal 142, as the operator depresses accelerator pedal 142 to and beyond (e.g., in a first direction) a forward threshold. Then, reverse torque is applied to wheels 154, e.g., based on a position of accelerator pedal 142, as the operator releases accelerator pedal 142 to and beyond (e.g., in a second direction) the forward threshold or a reverse threshold. As shown, this actuation of accelerator pedal 142 can be repeated indefinitely until one-pedal rocking is deactivated, e.g., responsive to detecting an exit condition or response to an operator selection via HMI 102. However, with reference to the above discussions of one-pedal operations, it should be understood that FIGS. 3C-3E are intended to be illustrative of different techniques of controlling electric vehicle 152 using a single pedal but are not intended to be limiting.

Example GUIs

Referring now to FIGS. 4A-4C, various example GUIs relating to the one-pedal rocking mode described herein are shown, according to some implementations. As mentioned above, any of the GUIs illustrated in FIGS. 4A-4C are examples of the GUIs that can be presented via HMI 102 and/or generated by GUI generator 120. For example, the illustrated GUIs can be presented via an infotainment system, gauge cluster, or other display device in electric vehicle 152. Turning first to FIG. 4A, in particular, a GUI 400 is shown which includes a selectable icon, button, or other graphical element—shown as button 402—that can be selected by a user to request the enablement of one-pedal rocking mode. While not shown, it should be appreciated that button 402 may be one of a plurality of selectable graphical elements that can be displayed, e.g., to allow the user to select any of a variety of different operating modes. It should be appreciated that button 402 may be accessed via a menu or by otherwise navigating through various other screens on HMI 102.

Once a user selects button 402, controller 110 can attempt to activate one-pedal rocking mode. As discussed above, this can include determining if various activation conditions are met. In the event that one or more activation conditions are not met, a notification 404 may be presented (e.g., as at step 224 of process 200) alerting the user to one-pedal rocking mode is not available and optionally providing a reasoning for preventing activation of one-pedal rocking mode. In this example, notification 404 indicates that one-pedal rocking mode is not available because electric vehicle 152 is not in an "off-road" or AWD mode. While illustrated as an "overlay" to the background elements of GUI 410, it should be appreciated that the positioning of notification 404 in GUI 410 is not intended to be limited. For example, notification 404 could be present in another location in GUI 410 or may be an entirely separate GUI.

FIG. 4B shows a GUI 410, which is an example of a GUI that can be presented (e.g., via HMI 102) while one-pedal rocking mode is enabled (e.g., while electric vehicle 152 is operating in one-pedal rocking mode). To this point, GUI 410 can indicate to a user that one-pedal rocking mode is enabled or "active," as shown. In some implementations, GUI 410 can also include an information field 412 that indicates various information associated with the operation of electric vehicle 152 in one-pedal rocking mode. For example, information field 412 may indicate instructions for performing one-pedal rocking, e.g., presented as text, an animation, a video, etc. The instructions may describe, for example, how to start one-pedal rocking (e.g., by depressing accelerator pedal 142) and how to rock electric vehicle 152 by alternating between forward and reverse motion using accelerator pedal 142. An animation or video, for example, could demonstrate to an operator of electric vehicle 152 how to manipulate accelerator pedal 142 to achieve a rocking motion.

Information field 412 may also, or alternatively, indicate other information, such as warnings, sensor data, or other operating information associated with electric vehicle 152. For example, information field 412 may be used to present warnings when one or more of wheels 154 are spinning above a certain speed, when an obstacle is detected, if electric motors 132 or power source 136 are overheating, etc. Sensor data or other operating information may include any sort of operating data that may be of interest to an operator of electric vehicle 152. For example, when off-roading, an operator may be interested in viewing wheel speeds, torque distribution, vehicle angle or roll, etc. As another example, information field 412 may provide video feeds from one or more cameras of electric vehicle 152 (e.g., camera(s) 148) so that the operator can view an area around electric vehicle 152 (e.g., the ground around electric vehicle 152).

As shown, GUI 410 may also include a selectable icon, button, or other graphical element that can be selected by a user (e.g., via touch on HMI 102) to exit or cancel one-pedal rocking mode. In this example, GUI 410 includes an "exit" button 414 that, when selected by a user, cancels one-pedal rocking mode, and returns electric vehicle 152 to a normal or "standard" operating mode. In some implementations, selecting exit button 414 further causes HMI 102 to return to a menu, home screen, or other GUI, so that the user can continue normal operations of electric vehicle 152.

FIG. 4C shows a GUI 420, which is a variation of GUI 410 that includes a notification 422 indicating that the one-pedal rocking mode has been disabled. In particular, notification 422 is shown to overlay the information originally included on GUI 410; however, the specific arrangement of notification 422 in GUI 420 is not intended to be limiting. For example, notification 422 may be positioned elsewhere in GUI 420, may be arranged such that it does not overlay the information of GUI 410, or may constitute an entirely different GUI than GUI 410. Regardless, as in this example, notification 422 is intended to alert an operator of electric vehicle 152 that one-pedal rocking has been disabled (e.g., as in step 228 of process 200) and can provide an indication as to the reasoning for one-pedal rocking being disabled. In this case, notification 422 indicates that one-pedal rocking was disabled because a speed of electric vehicle 152 was determined to exceed a maximum allowable speed for one-pedal rocking. As shown, notification 422 may optionally include a selectable icon, button, or other graphical element that can be selected by a user (e.g., via touch on HMI 102) to acknowledge the notification and information contained therein. In some implementations, selecting the icon, button, or other graphical element, causes HMI 102 to return to a menu, home screen, or other GUI, so that the user can continue normal operations of electric vehicle 152.

Configuration of Certain Implementations

The construction and arrangement of the systems and methods as shown in the various implementations are illustrative only. Although only a few implementations have been described in detail in this disclosure, many modifications are possible (e.g., variations in sizes, dimensions, structures, shapes, and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

What is claimed is:

1. A controller for an electric vehicle, the controller comprising:

at least one processor; and memory having instructions stored thereon that, when executed by the at least one processor, cause the controller to:

receive, via a human-machine interface (HMI) of the electric vehicle, an indication of a user selection to enter a first operating mode for extricating the electric vehicle from a stuck condition;

operate the electric vehicle in the first operating mode responsive to detecting movement of an accelerator pedal of the electric vehicle;

while in the first operating mode, control at least one electric motor of the electric vehicle to: (i) apply a forward torque to corresponding drive wheels of the electric vehicle when the accelerator pedal is in a first pedal position that exceeds a forward threshold, (ii) apply a reverse torque to the corresponding drive wheels of the electric vehicle when the accelerator pedal is in a second pedal position that is less than or equal to the forward threshold and greater than a zero position, wherein the zero position is an initial position of accelerator pedal associated with no external force being applied to accelerator pedal to actuate the accelerator pedal, and wherein no torque is applied to the at least one electric motor in the zero position; and exit the first operating mode by switching operations of the electric vehicle from the first operating mode to a second operating mode responsive to a determination that an exit condition has been met.

2. The controller of claim 1, wherein the second pedal position is further defined as being less than or equal to a reverse threshold, which is less than the forward threshold, such that a neutral zone is defined between the reverse threshold and the forward threshold, wherein: (i) application of the forward torque is maintained if the accelerator pedal is actuated from the first pedal position to a third position within the neutral zone and application of the reverse torque is maintained if the accelerator pedal is actuated from the second pedal position to the third position, or (ii) neither the forward torque nor the reverse torque is applied if a position of the accelerator pedal is within the neutral zone.

3. The controller of claim 1, wherein the instructions further cause the controller to:

evaluate activation conditions for the first operating mode responsive to receiving the indication but prior to operating the electric vehicle in the first operating mode; and prevent the electric vehicle from operating in the first operating mode if any of the activation conditions are not met, wherein the activation conditions include:

a speed of the electric vehicle being zero;

an all-wheel drive (AWD), four-wheel drive (4WD), or off-road setting of the electric vehicle being active; and an area within a threshold distance of the electric vehicle being free from obstacles.

4. The controller of claim 3, wherein the instructions further cause the controller to:

present, via the HMI, a notification indicating to the operator that the electric vehicle is not able to operate in the first operating mode, wherein the notification indicates a condition that prevents the electric vehicle from operating in the first operating mode.

5. The controller of claim 3, wherein the instructions further cause the controller to:

present via the HMI, a notification indicating to the operator that the electric vehicle is in the first operating mode responsive to determining that the electric vehicle is able to operate in the first operating mode.

6. The controller of claim 5, wherein the notification includes at least one of:

(i) operator instructions for controlling the accelerator pedal while in the first operating mode, or (ii) a warning indicating risks associated with operating in the first operating mode.

7. The controller of claim 1, wherein the exit condition comprises at least one of:

an indication of a user selection to exit the first operating mode received via the HMI;

a speed of the electric vehicle exceeding a speed threshold;

a load applied to the at least one electric motor exceeding a load threshold;

detection of an object within a threshold distance of the electric vehicle;

an all-wheel drive (AWD), four-wheel drive (4WD), or off-road setting of the electric vehicle being inactive or deactivated; or a time threshold being exceeded when applying the reverse torque to the corresponding drive wheels of the electric vehicle.

8. The controller of claim 1, wherein the instructions further cause the controller to:

presenting, via the HMI, a notification prompting the operator of the electric vehicle to activate the first operating mode responsive to detecting a stuck condition based on data from a plurality of sensors of the electric vehicle.

9. A method of controlling an electric vehicle, the method comprising:

receiving, via a human-machine interface (HMI) of the electric vehicle, an indication of a user selection to activate a first operating mode for extricating the electric vehicle from a stuck condition;

operating the electric vehicle in the first operating mode responsive to detecting movement of an accelerator pedal of the electric vehicle;

while in the first operating mode, controlling at least one electric motor of the electric vehicle to: (i) apply a forward torque to corresponding drive wheels of the electric vehicle when the accelerator pedal is in a first pedal position that exceeds a forward threshold, (ii) apply a reverse torque to the corresponding drive wheels of the electric vehicle when the accelerator pedal is in a second pedal position that is less than or equal to the forward threshold and greater than a zero position, wherein the zero position is an initial position of accelerator pedal associated with no external force being applied to accelerator pedal to actuate the accelerator pedal, and wherein no torque is applied to the at least one electric motor in the zero position; and exiting the first operating mode by switching operations of the electric vehicle from the first operating mode to a second operating mode responsive to a determination that an exit condition has been met.

10. The method of claim 9, wherein the second pedal position is further defined as being less than or equal to a reverse threshold, which is less than the forward threshold, such that a neutral zone is defined between the reverse threshold and the forward threshold, wherein: (i) application of the forward torque is maintained if the accelerator pedal is actuated from the first pedal position to a third position within the neutral zone and application of the reverse torque is maintained if the accelerator pedal is actuated from the second pedal position to the third position, or (ii) neither the forward torque nor the reverse torque is applied if a position of the accelerator pedal is within the neutral zone.

11. The method of claim 9, further comprising:

evaluating activation conditions for the first operating mode responsive to receiving the indication but prior to operating the electric vehicle in the first operating mode; and preventing the electric vehicle from operating in the first operating mode if any of the activation conditions are not met, wherein the activation conditions include:

a speed of the electric vehicle being zero;

an all-wheel drive (AWD), four-wheel drive (4WD), or off-road setting of the electric vehicle being active; and an area within a threshold distance of the electric vehicle being free from obstacles.

12. The method of claim 11, further comprising:

presenting, via the HMI, a notification indicating to the operator that the electric vehicle is not able to operate in the first operating mode, wherein the notification indicates a condition that prevents the electric vehicle from operating in the first operating mode.

13. The method of claim 11, further comprising:

presenting, via the HMI, a notification indicating to the operator that the electric vehicle is in the first operating mode responsive to determining that the electric vehicle is able to operate in the first operating mode.

14. The method of claim 13, wherein the notification includes at least one of:

(i) operator instructions for controlling the accelerator pedal while in the first operating mode, or (ii) a warning indicating risks associated with operating in the first operating mode.

15. The method of claim 9, wherein the exit condition comprises at least one of:

an indication of a user selection to exit the first operating mode received via the HMI;

a speed of the electric vehicle exceeding a speed threshold;

a load applied to the at least one electric motor exceeding a load threshold;

detection of an object within a threshold distance of the electric vehicle;

an all-wheel drive (AWD), four-wheel drive (4WD), or off-road setting of the electric vehicle being inactive or deactivated; or a time threshold being exceeded when applying the reverse torque to the corresponding drive wheels of the electric vehicle.

16. The method of claim 9, further comprising:

presenting, via the HMI, a notification prompting the operator of the electric vehicle to activate the first operating mode responsive to detecting a stuck condition based on data from a plurality of sensors of the electric vehicle.

17. An electric vehicle comprising:

a human-machine interface (HMI) configured to display graphical user interfaces (GUIs) and receive user inputs;

a powertrain comprising at least one electric motor configured to apply forward and reverse torque to corresponding drive wheels of the electric vehicle based on inputs to an accelerator pedal; and a controller configured to operate in a plurality of operating modes, including a first operating mode for extricating the electric vehicle from a stuck condition, wherein responsive to receiving an indication of a user selection to enter the first operating mode via the HMI and subsequently detecting movement of the accelerator pedal, the controller controls the at least one electric motor to: (i) apply a forward torque to the drive wheels when the accelerator pedal is in a first pedal position that exceeds a forward threshold, (ii) apply a reverse torque to the drive wheels when the accelerator pedal is in a second pedal position that is less than or equal to the forward threshold and greater than a zero position, wherein the zero position is an initial position of accelerator pedal associated with no external force being applied to accelerator pedal to actuate the accelerator pedal, and wherein no torque is applied to the at least one electric motor in the zero position, wherein the controller is further configured to switch from the first operating mode to a second operating mode responsive to a determination that an exit condition has been met.

18. The electric vehicle of claim 17, wherein the exit condition comprises at least one of:

an indication of a user selection to exit the first operating mode received via the HMI;

a speed of the electric vehicle exceeding a speed threshold;

a load applied to the at least one electric motor exceeding a load threshold;

detection of an object within a threshold distance of the electric vehicle;

an all-wheel drive (AWD), four-wheel drive (4WD), or off-road setting of the electric vehicle being inactive or deactivated; or a time threshold being exceeded when applying the reverse torque to the corresponding drive wheels of the electric vehicle.

* * * * *